United States Patent
Luo

(10) Patent No.: US 12,242,719 B2
(45) Date of Patent: Mar. 4, 2025

(54) SPLIT-SCREEN DISPLAY METHOD AND ELECTRONIC DEVICE

(71) Applicant: HUAWEI TECHNOLOGIES CO., LTD., Guangdong (CN)

(72) Inventor: Yi Luo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 107 days.

(21) Appl. No.: 17/764,426

(22) PCT Filed: Jul. 16, 2020

(86) PCT No.: PCT/CN2020/102488
§ 371 (c)(1),
(2) Date: Mar. 28, 2022

(87) PCT Pub. No.: WO2021/063074
PCT Pub. Date: Apr. 8, 2021

(65) Prior Publication Data
US 2022/0357845 A1 Nov. 10, 2022

(30) Foreign Application Priority Data
Sep. 30, 2019 (CN) .......................... 201910938898.X

(51) Int. Cl.
*G06F 3/048* (2013.01)
*G06F 3/04817* (2022.01)
(Continued)

(52) U.S. Cl.
CPC ...... *G06F 3/04886* (2013.01); *G06F 3/04817* (2013.01); *G06F 3/0486* (2013.01);
(Continued)

(58) Field of Classification Search
CPC . G06F 3/04886; G06F 3/04817; G06F 3/0486
See application file for complete search history.

(56) References Cited

U.S. PATENT DOCUMENTS

2014/0089831 A1\* 3/2014 Kim .................... G06F 3/04883
715/769
2014/0089832 A1\* 3/2014 Kim .................... G06F 3/04883
715/788
(Continued)

FOREIGN PATENT DOCUMENTS

CN 103268190 A 8/2013
CN 103412711 A 11/2013
(Continued)

OTHER PUBLICATIONS

Cahil et al., Scroll Bar Indexing with Split Screen View Option, 1994, IBM, 3 pages. (Year: 1994).\*
(Continued)

*Primary Examiner* — Linh K Pham

(57) ABSTRACT

Embodiments of the present invention provide a split-screen display method and an electronic device. The method includes: An electronic device displays a display interface corresponding to a first task on a display when running a first application to execute the first task; receives, on the display interface corresponding to the first task, a first operation used to enable a second task; and enables a split-screen display mode in response to the first operation.

12 Claims, 28 Drawing Sheets

(51) Int. Cl.
*G06F 3/0486* (2013.01)
*G06F 3/04886* (2022.01)

(52) U.S. Cl.
CPC .............. *G06F 2203/04803* (2013.01); *G06F 2203/04808* (2013.01)

(56) References Cited

U.S. PATENT DOCUMENTS

| | | | |
|---|---|---|---|
| 2014/0157163 A1* | 6/2014 | Strutin-Belinoff | G06F 3/04883 715/781 |
| 2016/0048320 A1 | 2/2016 | Han et al. | |
| 2016/0092064 A1* | 3/2016 | Wu | G06F 3/04817 715/789 |
| 2016/0139866 A1* | 5/2016 | Lee | G06F 3/0481 715/802 |
| 2017/0344253 A1* | 11/2017 | Zhang | H04M 1/7243 |
| 2018/0121082 A1* | 5/2018 | Zhu | G06F 3/04847 |
| 2018/0164987 A1* | 6/2018 | Murphy | G06F 3/04845 |
| 2018/0286277 A1 | 10/2018 | Shah | |
| 2019/0187893 A1* | 6/2019 | Gan | G06F 3/04886 |
| 2020/0183574 A1* | 6/2020 | Chen | G06F 3/04883 |
| 2021/0312917 A1* | 10/2021 | Weksler | G06F 3/167 |

FOREIGN PATENT DOCUMENTS

| | | | |
|---|---|---|---|
| CN | 104898952 A | | 9/2015 |
| CN | 106598429 A | | 4/2017 |
| CN | 106970769 A | | 7/2017 |
| CN | 107515691 A | | 12/2017 |
| CN | 107908351 A | | 4/2018 |
| CN | 107908382 A | | 4/2018 |
| CN | 108509110 A | | 9/2018 |
| CN | 108632462 A | | 10/2018 |
| CN | 108804004 A | | 11/2018 |
| CN | 108984065 A | | 12/2018 |
| CN | 110244893 A | | 9/2019 |
| CN | 110865744 A | | 3/2020 |
| JP | 2015032091 A | | 2/2015 |
| JP | 2016532946 A | | 10/2016 |
| KR | 20130126430 | * | 8/2012 |
| KR | 20130126430 A | | 11/2013 |
| KR | 20160020166 | * | 8/2014 |
| KR | 20160020166 A | | 2/2016 |

OTHER PUBLICATIONS

Russel et al., Method to enter split view, 2013, Lenovo, 23 paged (Year: 2013).*

Chen lian gang et al, E-commerce website construction and management editing, 2010, 4 pages (with an English abstract).

* cited by examiner

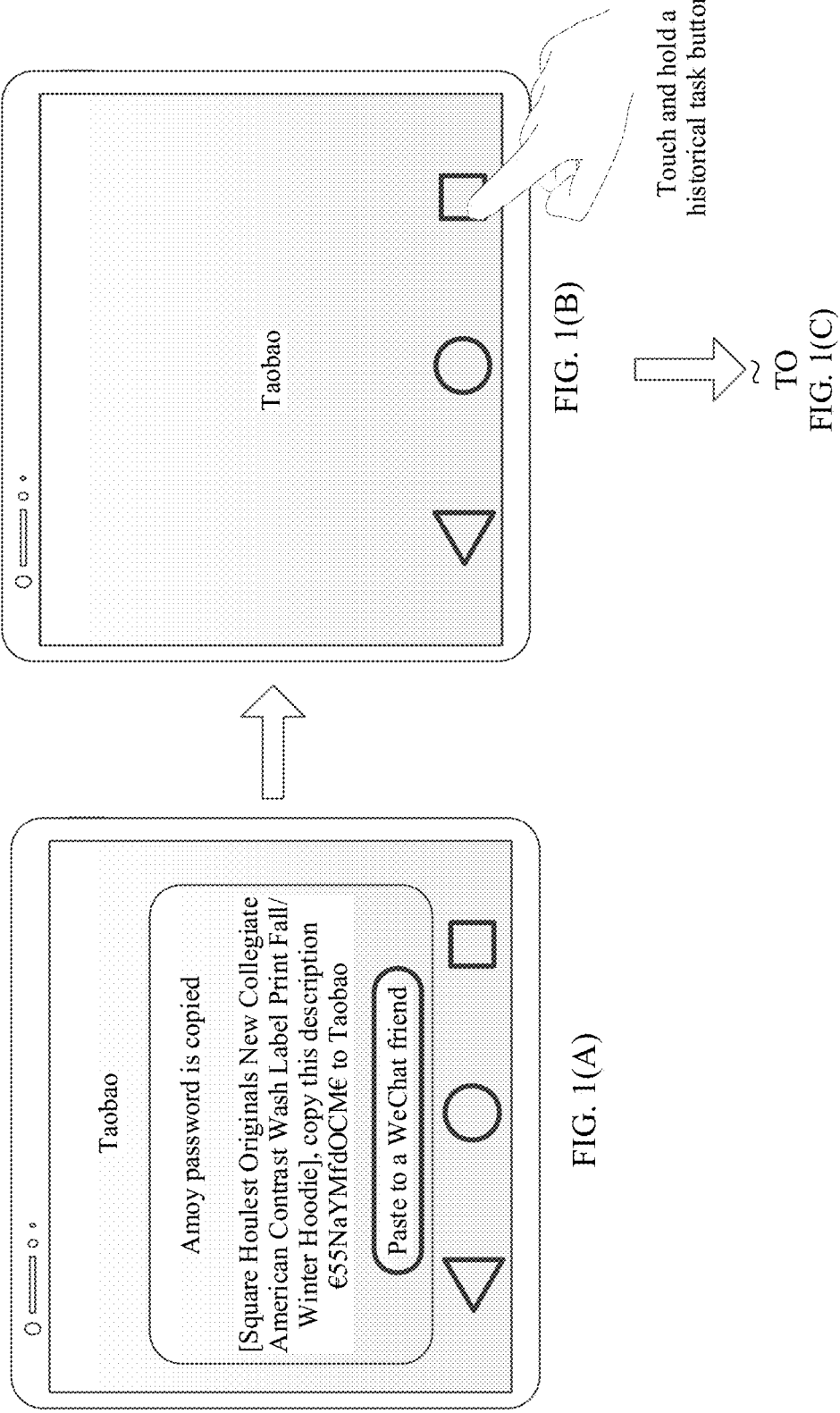

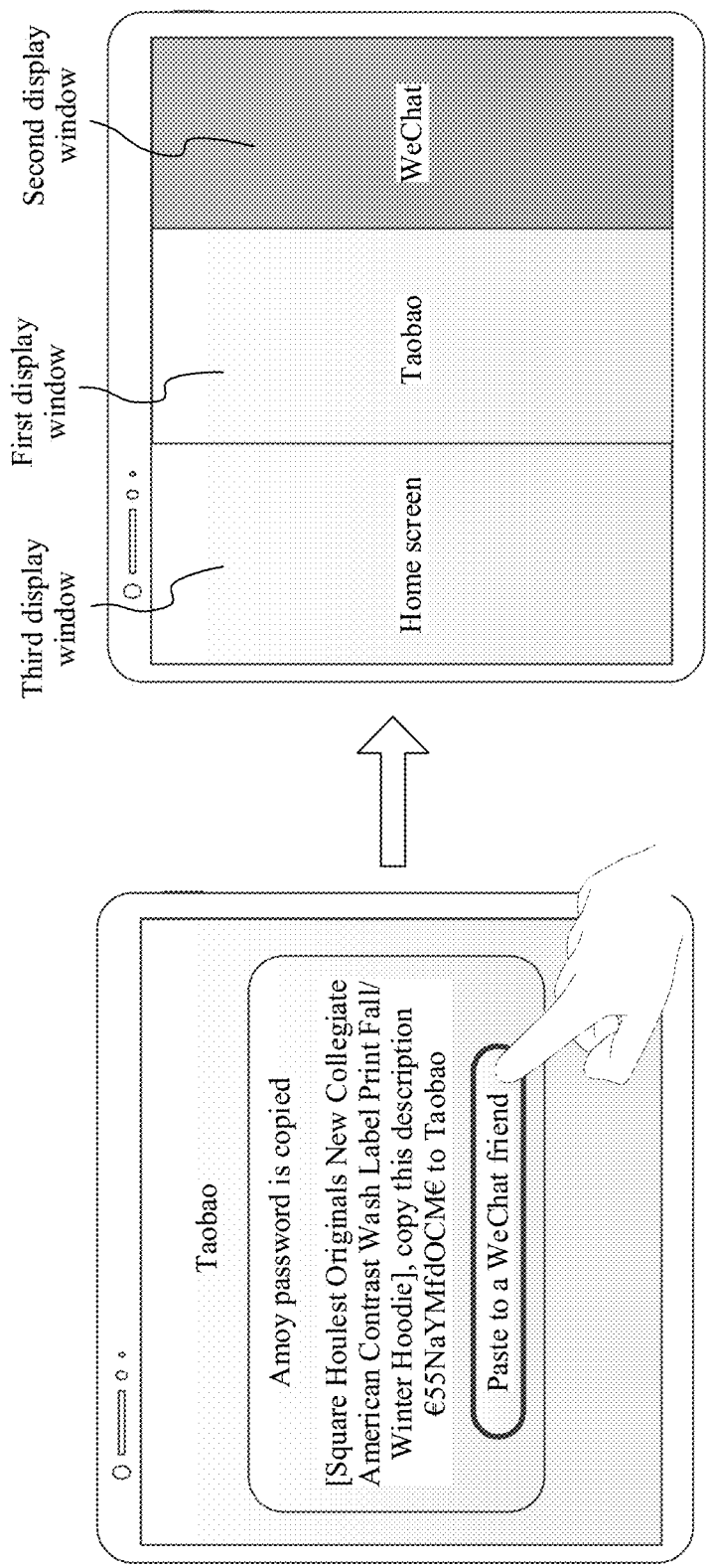

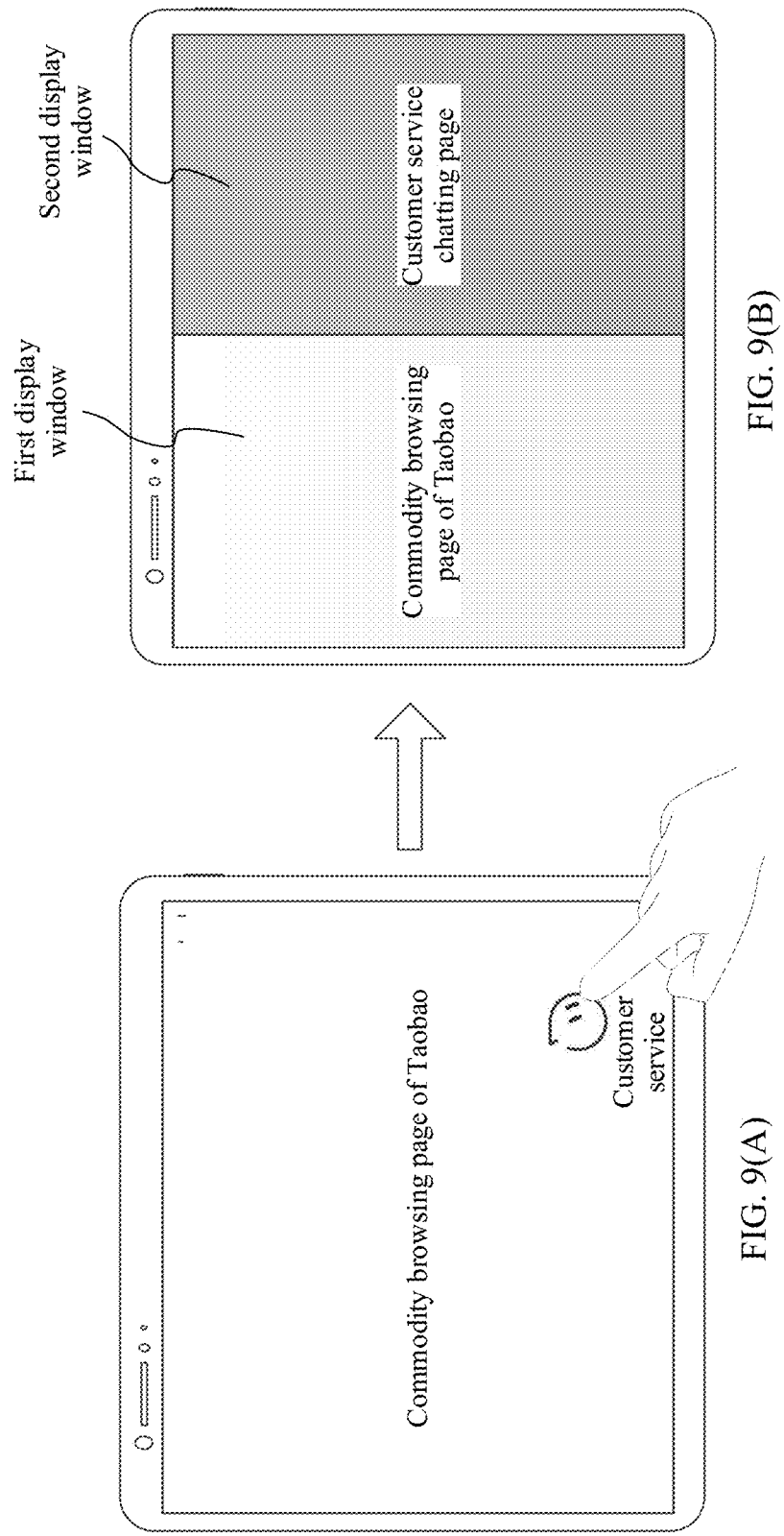

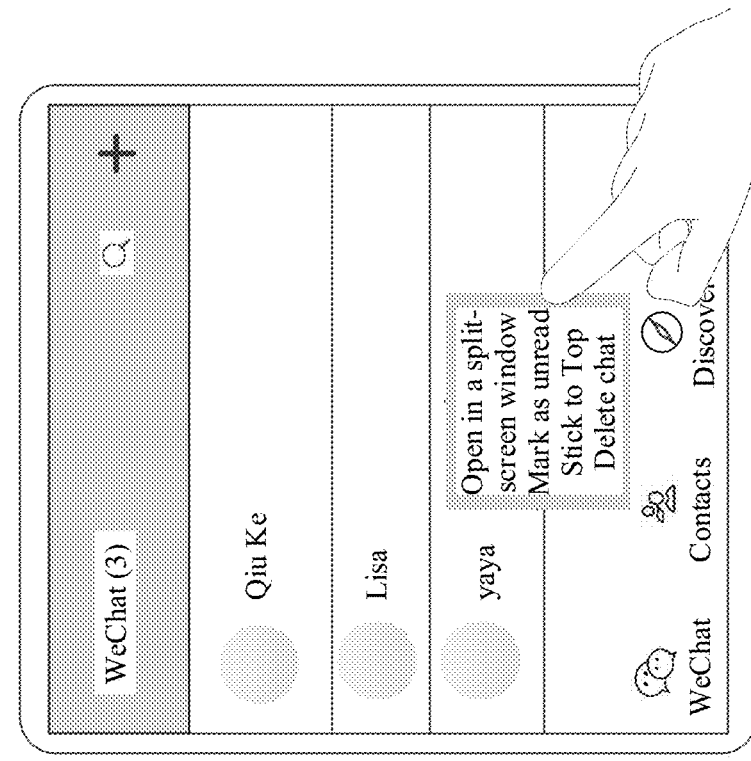
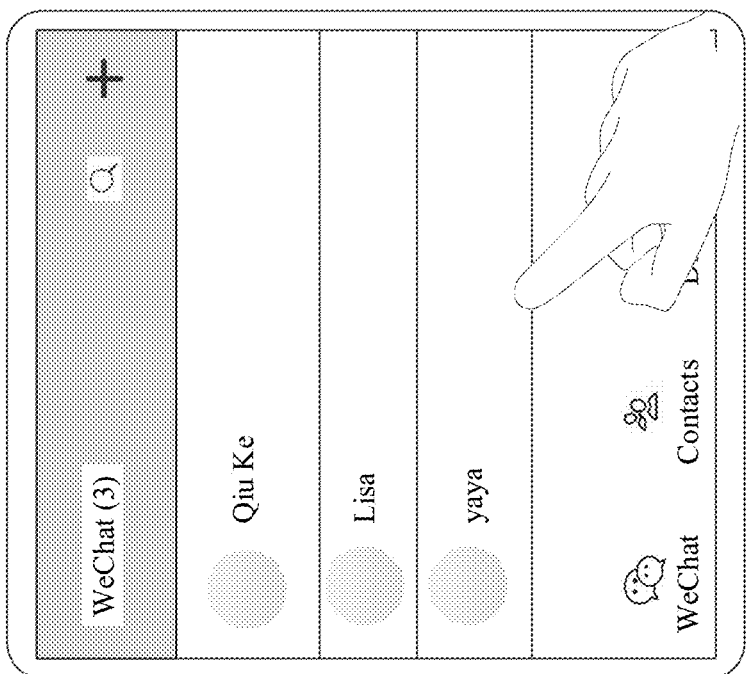
FIG. 10(A)
FIG. 10(B)
TO
FIG. 10(C)

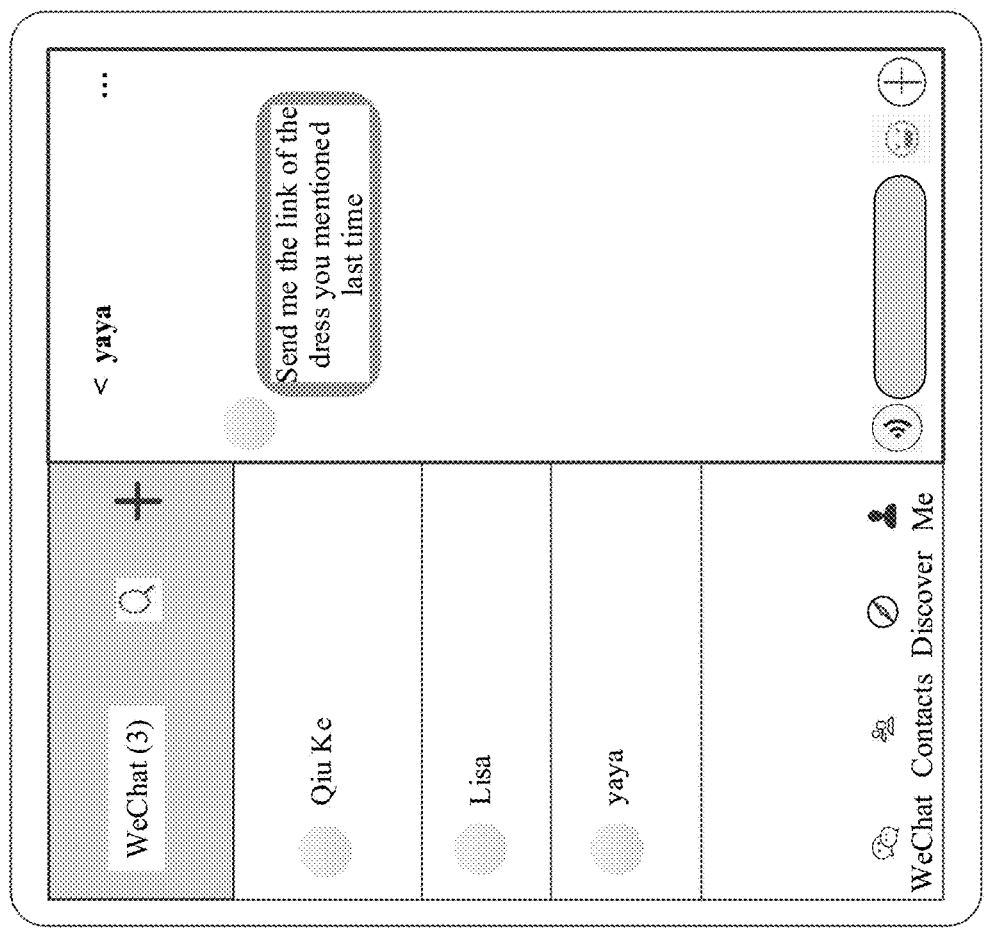

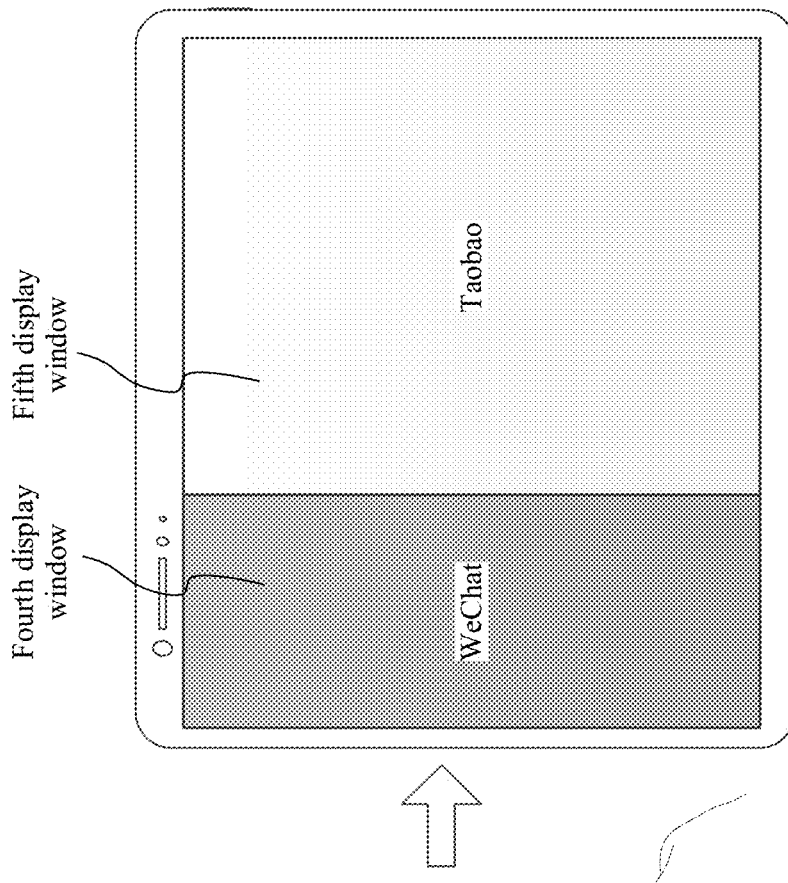
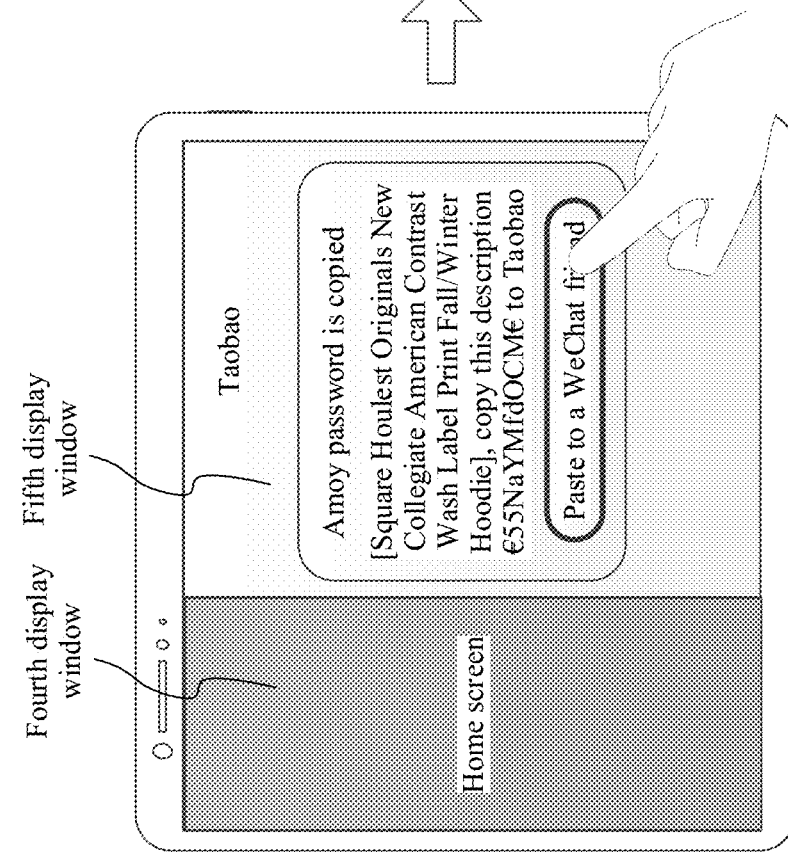
FIG. 12(A)
FIG. 12(B)

CONT.
FROM
FIG. 13(A)
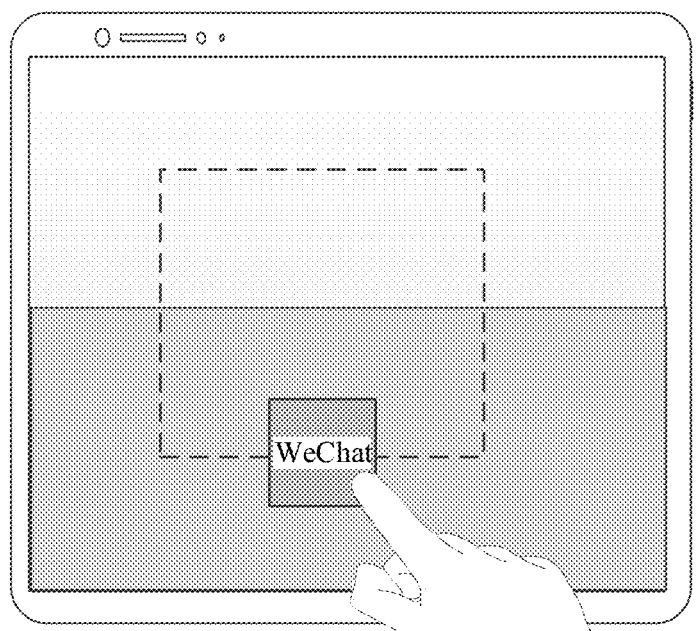
FIG. 13(B)
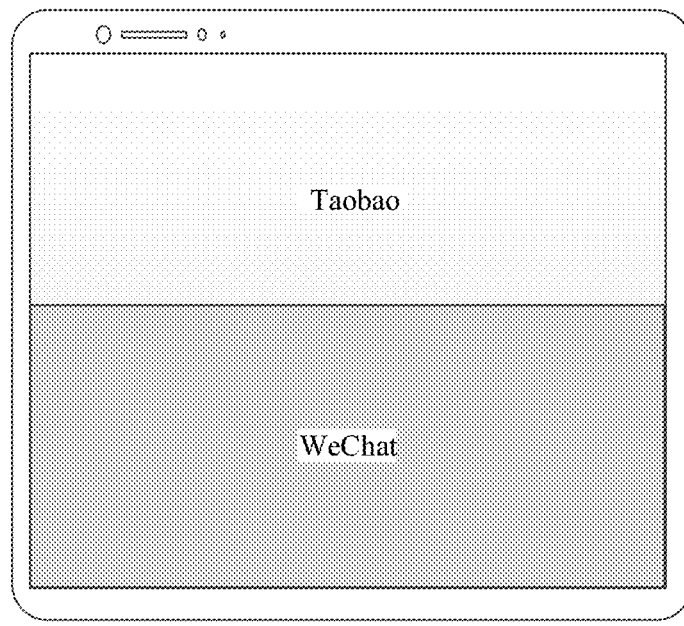
FIG. 13(F)

↑

~
CONT.
FROM

CONT.
FROM
FIG. 14(A)
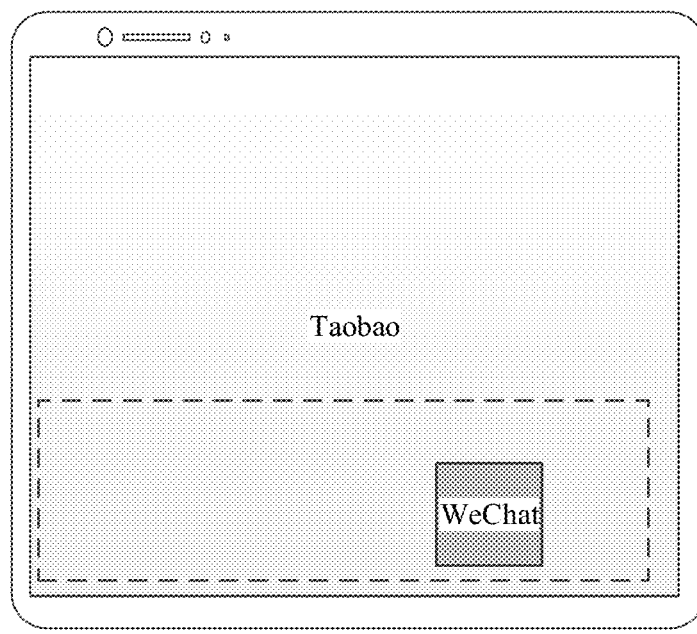
FIG. 14(B)
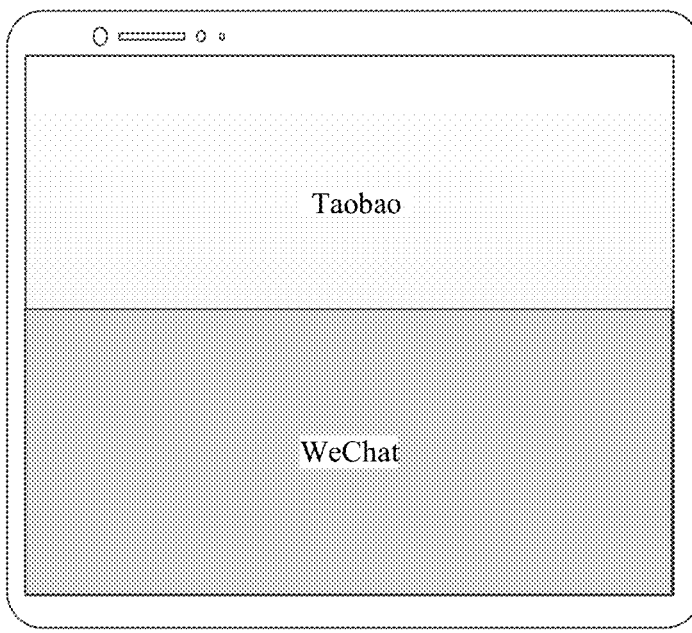
FIG. 14(F)

FROM

TO FIG. 15(C)

SPLIT-SCREEN DISPLAY METHOD AND ELECTRONIC DEVICE

CROSS-REFERENCE TO RELATED APPLICATIONS

This application is a National Stage of International Application No. PCT/CN2020/102488 filed on Jul. 16, 2020, which claims priority to Chinese Patent Application No. 201910938898.X, filed on Sep. 30, 2019, both of which are hereby incorporated by reference in their entireties.

TECHNICAL FIELD

This application relates to the field of terminal technologies, and in particular, to a split-screen display method and an electronic device.

BACKGROUND

To improve visual experience, screens of various electronic devices become larger. The electronic device provides a split-screen mode, to meet a requirement of a user to simultaneously operate a plurality of applications. For example, the electronic device may simultaneously display windows of two applications.

In the conventional technology, an electronic device needs to be manually triggered by a user to enter a split-screen mode. For example, when the electronic device displays a window of an application A in full screen, the user may touch and hold a historical task button to enable the electronic device to enter the split-screen mode, and then the user manually selects an application that needs to be displayed in a split-screen window, for example, taps an icon of an application B. In this way, the application A and the application B are displayed in different windows.

It can be learned that, in the conventional technology, the electronic device needs to be manually triggered by the user to enter the split-screen mode, and an operation process is relatively cumbersome. This is not intelligent enough.

SUMMARY

Embodiments of the present invention provide a split-screen display method and an electronic device, to achieve a technical effect of triggering, based on a task, an electronic device to enable a split-screen display mode, so as to improve intelligence of the electronic device.

According to a first aspect, an embodiment of the present invention provides a split-screen display method, where the method includes: displaying a display interface corresponding to a first task on a display when a first application is run to execute the first task; receiving, on the display interface corresponding to the first task, a first operation used to enable a second task; and enabling a split-screen display mode in response to the first operation. To be specific, when an electronic device runs the first application to execute the first task, if the first operation used to enable the second task is received on the display interface corresponding to the first task, the electronic device may be triggered, by using the second task, to enter the split-screen display mode. Compared with that in the conventional technology, the split-screen mode can be triggered without an additional manual operation of a user. This achieves a technical effect of triggering, based on a task, an electronic device to perform split-screen display, so that intelligence of the electronic device is improved.

In a possible design, when running the first application to execute the first task, the electronic device may display the display interface corresponding to the first task on the display in full screen. In this way, split-screen display can be performed based on a task in a full-screen display mode, and a full-screen mode can be switched to a split-screen mode without an additional manual operation of a user, so that intelligence of interaction is improved.

In a possible design, the second task may be a task in a second application, and the second application is different from the first application. In other words, the technical solutions in the embodiments of the present invention may be applicable to a cross-application split-screen scenario, so that user experience is improved.

In another possible design, the second task may be a task in the first application. In other words, the technical solutions in the embodiments of the present invention may further be applicable to an in-application split-screen scenario. This can further improve intelligence of split-screen display and improve user experience.

In a possible design, when the electronic device enables the split-screen display mode in response to the first operation, the electronic device may specifically generate at least two display windows on the display, where the at least two display windows include a first display window and a second display window; display the display interface corresponding to the first task in the first display window; and display a display interface corresponding to the second task in the second display window. In other words, when the second task is triggered, the electronic device may directly enter the split-screen mode, and display the display interface of the second task in a split-screen window. This improves interaction efficiency of the electronic device.

In a possible design, when the electronic device enables the split-screen display mode in response to the first operation, the electronic device may alternatively generate a view of a display interface corresponding to the second task, and display the view on the display interface corresponding to the first task; determine a location of a split-screen display window based on a second operation for the view in response to the second operation; display the split-screen display window at the location of the split-screen display window; and display the display interface corresponding to the second task in the split-screen display window. In other words, after enabling of the split-screen mode is triggered based on the first operation (for enabling the second task), the display location of the split-screen window may be further determined based on the received second operation, that is, the user may indicate the display location of the split-screen window by performing the second operation. This can further improve interaction intelligence of the electronic device and improve user experience.

In a possible design, the second operation may include a plurality of sub-operation steps, to avoid accidental triggering of split-screen display, so as to improve reliability of split-screen display.

For example, the second operation may include a first sub-operation, and the first sub-operation may be an operation of dragging the view or a copy of the view to a preset location (for example, up, bottom, left, or right). Correspondingly, the electronic device displays the split-screen display window at the location of the split-screen display window after determining that the preset location is the location of the split-screen display window and receiving the first sub-operation.

Further, the second operation may also include a second sub-operation before the first sub-operation, and the second sub-operation may be an operation of touching and holding the view with a single finger or touching and holding the view with two fingers. In other words, the user can drag the view only after touching and holding the view with a single finger or touching and holding the view with two fingers. In this way, an accidental trigger of the user for dragging the view can be avoided, so that reliability of split-screen display is improved. Alternatively, if the user taps the view, the user may further cancel entering the split-screen mode, to restore full-screen display of the display interface of the first task.

Further, the second operation may also include a third sub-operation after the first sub-operation, and the third sub-operation may be an operation of tapping the view. Correspondingly, the electronic device displays the display interface corresponding to the second task in the split-screen display window only after receiving the third sub-operation. In other words, after dragging the view to a specified solution location, the user further needs to perform the operation of tapping the view to determine to display the display interface of the second task in the split-screen window. In this way, an accidental trigger of the user for dragging the view can be better avoided, so that reliability of split-screen display is improved.

According to a second aspect, an embodiment of the present invention provides an electronic device, including a display; one or more processors; a memory; a plurality of applications; and one or more computer programs, where the one or more computer programs are stored in the memory, the one or more computer programs include instructions, and when the instructions are invoked and executed by the one or more processors, the electronic device is enabled to perform the following steps: when running a first application to execute a first task, displaying a display interface corresponding to the first task on the display; receiving, on the display interface corresponding to the first task, a first operation used to enable a second task; and enabling a split-screen display mode in response to the first operation.

In a possible design, when the instructions are invoked and executed by the one or more processors, the electronic device is enabled to perform the following step: displaying the display interface corresponding to the first task on the display in full screen.

In a possible design, the second task is a task in the first application; or the second task is a task in a second application, and the second application is different from the first application.

In a possible design, when the instructions are invoked and executed by the one or more processors, the electronic device is enabled to perform the following steps: generating at least two display windows on the display, where the at least two display windows include a first display window and a second display window; displaying the display interface corresponding to the first task in the first display window; and displaying a display interface corresponding to the second task in the second display window.

In a possible design, when the instructions are invoked and executed by the one or more processors, the electronic device is enabled to perform the following steps: generating a view of a display interface corresponding to the second task, and displaying the view on the display interface corresponding to the first task; determining a location of a split-screen display window based on a second operation for the view in response to the second operation; displaying the split-screen display window at the location of the split-screen display window; and displaying the display interface corresponding to the second task in the split-screen display window.

In a possible design, the second operation includes a first sub-operation, and the first sub-operation is an operation of dragging the view or a copy of the view to a preset location; when the instructions are invoked and executed by the one or more processors, the electronic device is enabled to perform the following step: determining the preset location to be the location of the split-screen display window; and when the instructions are invoked and executed by the one or more processors, the electronic device is further enabled to perform the following step: displaying the split-screen display window at the location of the split-screen display window after the first sub-operation is received.

In a possible design, the second operation further includes a second sub-operation before the first sub-operation, and the second sub-operation is an operation of touching and holding the view with a single finger or touching and holding the view with two fingers.

In a possible design, the second operation further includes a third sub-operation after the first sub-operation, and the third sub-operation is an operation of tapping the view; and when the instructions are invoked and executed by the one or more processors, the electronic device is further enabled to perform the following step: displaying the display interface corresponding to the second task in the split-screen display window after the third sub-operation is received.

According to a third aspect, an embodiment of the present invention provides an electronic device. The electronic device includes modules/units for performing the method according to any one of the first aspect or the possible designs of the first aspect. These modules/units may be implemented by hardware, or may be implemented by hardware executing corresponding software.

According to a fourth aspect, an embodiment of the present invention provides a computer storage medium including computer instructions. When the computer instructions are run on an electronic device, the electronic device is enabled to perform the split-screen display method according to any one of the first aspect or the possible designs of the first aspect of the embodiments of the present invention.

According to a fifth aspect, an embodiment of the present invention provides a program product. When the program product runs on a computer, the computer is enabled to perform the split-screen display method according to any one of the first aspect or the possible designs of the first aspect of the embodiments of the present invention.

According to a sixth aspect, an embodiment of the present invention provides a chip. The chip is coupled to a memory in an electronic device, and is configured to invoke a computer program stored in the memory and perform the technical solution according to any one of the first aspect and the possible designs of the first aspect of the embodiments of the present invention. In the embodiments of the present invention, "coupling" means a direct combination or an indirect combination of two components.

According to a seventh aspect, an embodiment of the present invention provides a graphical user interface on an electronic device. The electronic device includes a display, one or more memories, and one or more processors, where the one or more processors are configured to execute one or more computer programs stored in the one or more memories; and the graphical user interface includes a graphical user interface displayed when the electronic device performs the split-screen display method according to any one of the first aspect or the possible designs of the first aspect of the embodiments of the present invention.

BRIEF DESCRIPTION OF DRAWINGS

FIG. 1(A) to FIG. 1(D) are a schematic diagram of triggering an electronic device to enter a split-screen mode in the conventional technology;

FIG. 8A(A) and FIG. 8A(B) are a schematic diagram of another split-screen display solution according to an embodiment of the present invention;

FIG. 9(A) and FIG. 9(B) are a schematic diagram of another split-screen display solution according to an embodiment of the present invention;

FIG. 10(A) to FIG. 10(C) are a schematic diagram of another split-screen display solution according to an embodiment of the present invention;

FIG. 12(A) and FIG. 12(B) are a schematic diagram of another split-screen display solution according to an embodiment of the present invention;

FIG. 13(A) to FIG. 13(F) are a schematic diagram of another split-screen display solution according to an embodiment of the present invention;

FIG. 14(A) to FIG. 14(F) are a schematic diagram of another split-screen display solution according to an embodiment of the present invention;

DESCRIPTION OF EMBODIMENTS

Figure 1C:
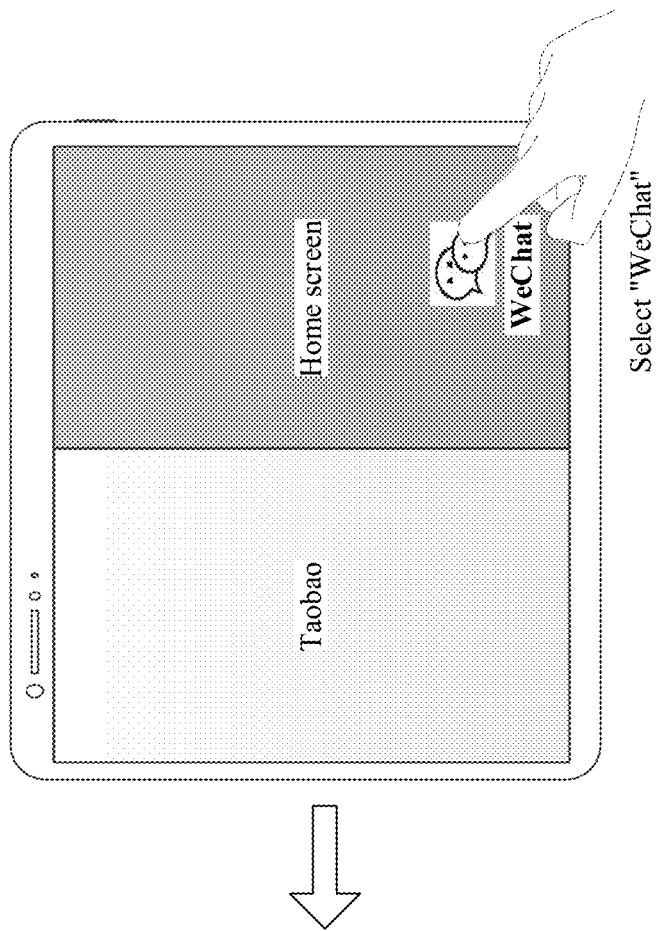

The following clearly and completely describes the technical solutions in the embodiments of the present invention with reference to the accompanying drawings according to the embodiments of the present invention.

Some terms in the present invention are first described, to help a person skilled in the art have a better understanding.

(1) An application (application, app for short) in the embodiments of the present invention is briefly referred to as an app and is a software program that can implement one or more specific functions. Generally, a plurality of applications may be installed on a terminal device, for example, an instant messaging application, a video application, an audio application, and an image shooting application. The instant messaging application may include, for example, Messages, WeChat (WeChat), WhatsApp Messenger, Line (Line), Instagram (Instagram), Kakao Talk, and DingTalk. The image shooting application may include, for example, a camera application (a system camera or a third-party camera application). The video application may include, for example, YouTube, Twitter, TikTok, iQIYI, and Tencent Video. The audio application may include, for example, Google Music, KuGou, EMUMO, and QQ Music. The application mentioned in the following embodiments may be an application installed before delivery of the terminal device, or may be an application downloaded from a network or obtained from another terminal device by a user in a process of using the terminal device.

(2) Screen splitting in the embodiments of the present invention refers to a technology in which a software system divides a physical screen into several display regions, so that a plurality of application pages can be simultaneously displayed.

(3) A display window in the embodiments of the present invention is also referred to as an "application window", a "window", and the like in this specification, and refers to a display region, and a display interface of an application is displayed in the display region. One application may correspond to one application window. An application window may be reduced or enlarged, so that a display interface in the application window is reduced or enlarged.

A display of an electronic device may display only one window. When the display displays only one window, the window may be displayed in full screen on the display, or may be displayed in non-full screen. This is not limited in the embodiments of the present invention. In full-screen display, the window occupies an entire valid display region of the display (or the window occupies a maximum display region that a system allows a window to occupy). In non-full-screen display, the window occupies only a partial valid display region of the display (or a display region occupied by the window is smaller than a maximum display region that a system allows a window to occupy). For example, when a mobile phone is in a one-hand operation mode, a display region occupied by a window is smaller than a maximum display region that a system allows a window to occupy.

Alternatively, a plurality of windows may be simultaneously displayed on the display of the electronic device. For example, in a split-screen mode of the electronic device such as a mobile phone or a tablet computer, a display region of the display is divided into several display regions. One display region is one display window, and user interfaces of different applications may be displayed in different display windows.

A split-screen window or a split-screen display window in the embodiments of the present invention refers to a new display interface that appears after a split-screen display mode is triggered. For example, the electronic device originally displays an application A in full screen, that is, the display has only one full-screen window for displaying the application A. After the electronic device is triggered to enter a split-screen display mode, the display of the electronic device is divided into two display regions, and the application A and an application B are separately displayed. In this case, a display region corresponding to the application B is referred to as a split-screen window.

(4) In the embodiments of the present invention, "at least one" means one or more, and "a plurality of" means two or more.

In addition, it should be understood that in the descriptions of the present invention, words such as "first" and "second" are merely used for a purpose of distinguishing description, and should not be understood as an indication or implication of relative importance, or should not be understood as an indication or implication of a sequence.

Terms used in the following embodiments are merely intended to describe specific embodiments, but are not intended to limit the present invention. Terms "one", "a", "the", "the foregoing", "this", and "the one" of singular forms used in this specification and the appended claims of the present invention are also intended to include forms like "one or more", unless otherwise specified in the context clearly. It should be further understood that, in the embodiments of the present invention, "one or more" means one, two, or more, and the term "and/or" describes an association between associated objects, and indicates that three relationships may exist. For example, A and/or B may indicate the following cases: Only A exists, both A and B exist, and only B exists, where A and B may be singular or plural. The character "/" usually indicates an "or" relationship between the associated objects.

Reference to "an embodiment", "some embodiments", or the like described in this specification indicates that one or more embodiments of the present invention include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment, instead, they mean "one or more but not all of the embodiments", unless otherwise specifically emphasized. The terms "include", "contain", "have", and their variants all mean "including but not limited to", unless otherwise specifically emphasized.

The following describes the background of the present invention.

FIG. 1(A) to FIG. 1(D) show an example in which an electronic device enters a split-screen mode in the conventional technology. When browsing "Taobao", if a user intends to share a commodity with a WeChat friend, as shown in FIG. 1(A), if the user copies an Amoy password of the commodity and wants to send the Amoy password to the WeChat friend, but does not want to exit a current display interface, the user may manually enable a split-screen mode, and open a WeChat interface in a split-screen window to perform a sharing operation.

Figure 1D:
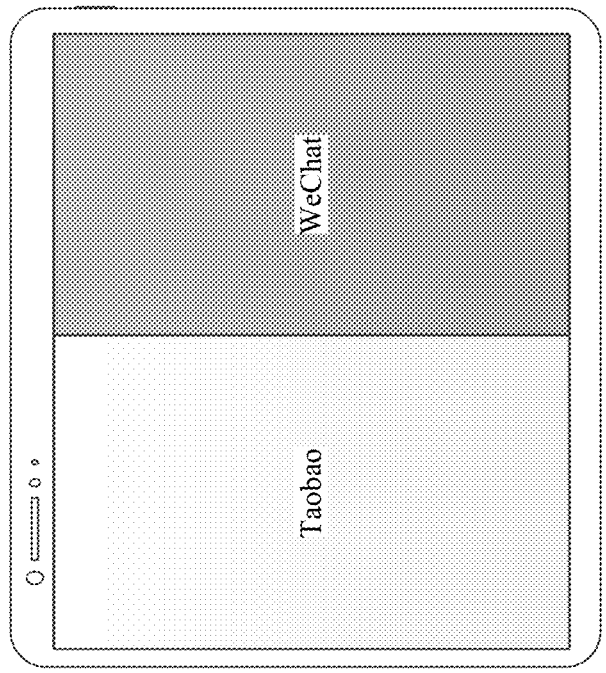

For example, as shown in FIG. 1(B), the user may trigger, by touching and holding a historical task button, the electronic device to enter the split-screen mode. A display status after the electronic device enters the split-screen mode is shown in FIG. 1(C). A display screen is divided from one display window into two display windows. Taobao is displayed in the left window, and a home screen is displayed in the right window (the split-screen window). Then, the user selects "WeChat" on the home screen, so that the WeChat interface is displayed in the right window. In this way, the user can use "WeChat" to chat with friends while using "Taobao" to browse commodities. However, as shown in FIG. 1(D), the process requires the user to manually perform a plurality of operations to trigger the split-screen mode to display Taobao and WeChat interfaces separately in two windows. This is cumbersome. In addition, another method for enabling split-screen display is to enable the split-screen display by a gesture. For example, a screen may be divided into two by using a knuckle to slide in the center of the screen. A display effect after the gesture enabling is similar to that in FIG. 1(C). Then, the user selects, in the split-screen window (home screen), an application (for example, WeChat) that needs to be displayed in split-screen. It can be learned that the process of enabling the split-screen display by using a gesture also requires the user to manually perform a plurality of cumbersome operations, and further requires the user to bear relatively high learning costs.

It can be learned from the foregoing descriptions that, in the conventional technology, the electronic device needs to be manually triggered by the user to enter the split-screen mode, and the operation process is relatively cumbersome. In addition, the split-screen mode in the conventional technology can be performed only for cross applications (that is, two different applications), for example, the foregoing "Taobao" and "WeChat", resulting in a specific function limitation. Therefore, the split-screen display solution in the conventional technology is low-intelligent.

In view of this, the embodiments of the present invention provide a split-screen display method and an electronic device. In a process of running a first application to execute a first task, the electronic device displays a display interface (a first display interface) of the first task on a display, and when receiving an operation of enabling a second task, directly enables a split-screen display mode and divides a screen into a plurality of display windows. Then, the electronic device displays the first display interface in a first display window, runs the second task, and displays a display interface (a second display interface) of the second task in a second display window. The second task may be another task in the first application, or may be a task in another application such as a second application. This is not limited herein. In this way, a technical effect of triggering, based on a task, the electronic device to enter the split-screen display mode, and displaying the interface of the second task in split screen can be implemented. Compared with the conventional technology, this method does not require a user to manually trigger the split-screen mode. Therefore, interactive intelligence is improved. In addition, the first task and the second task may be tasks of two different applications (that is, cross-application screen splitting is performed), or the first task and the second task may be tasks in a same application. Therefore, this solution may further implement a technical effect of in-application screen splitting. Intelligence of split-screen display can be further improved, to improve user experience. A specific technical solution is described in detail hereinafter.

The embodiments of the present invention may be applied to any electronic device that has a display. For example, the electronic device may be a portable electronic device such as a mobile phone, a foldable mobile phone, or a tablet computer, or may be a non-portable electronic device such as a desktop computer or a television, or may be a wearable electronic device such as a smart band, a watch, or a wearable device helmet, or may be an in-vehicle device or a smart home device (for example, a television). This is not limited in the embodiments of the present invention.

Figure 2:
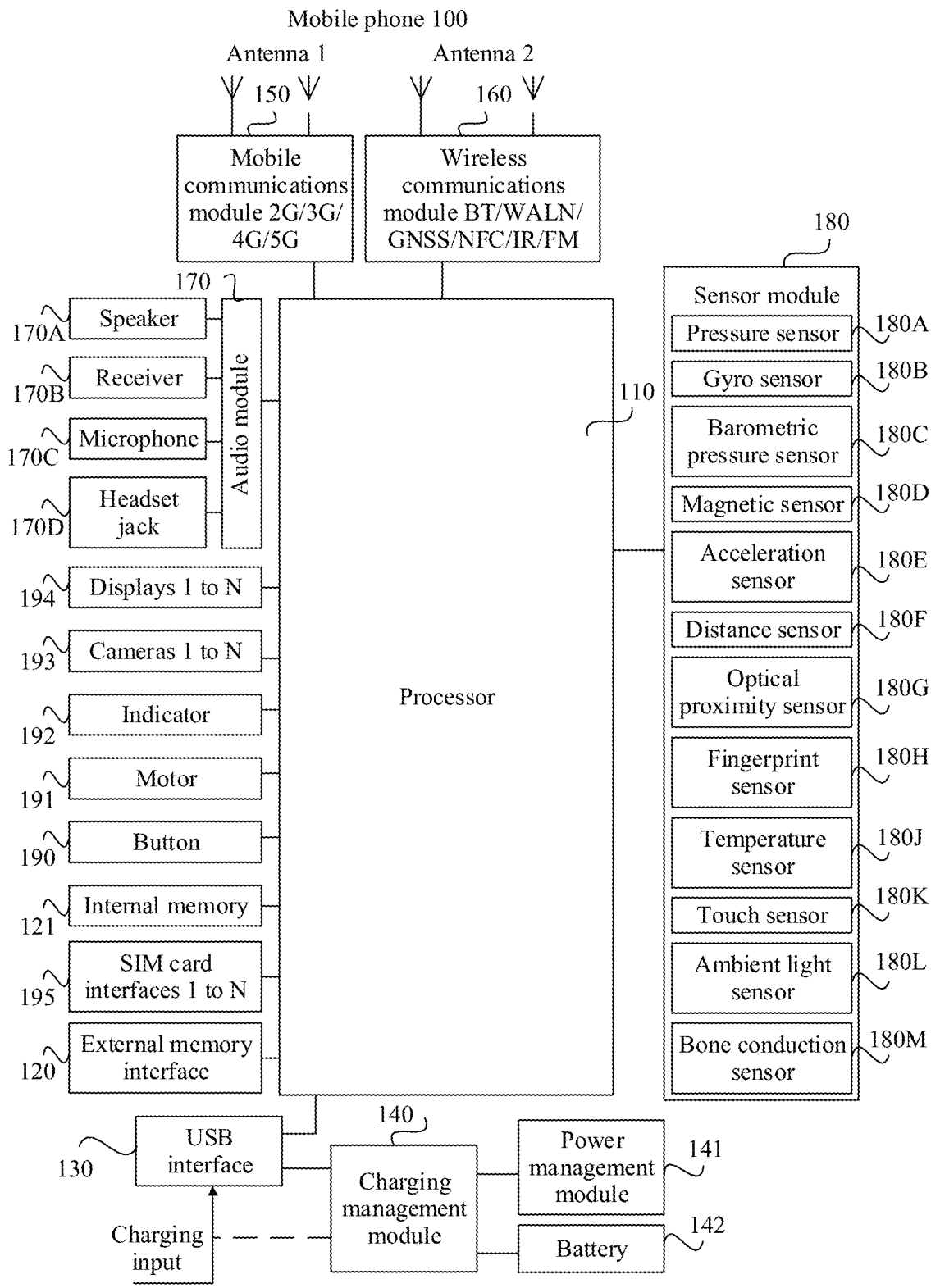
FIG. 2 is a schematic diagram of a hardware structure of an electronic device according to an embodiment of the present invention.

An electronic device, a graphical user interface (graphical user interface, GUI) for such an electronic device, and an embodiment for using such an electronic device are described below. In the following embodiments, an example in which the electronic device is a mobile phone is used. FIG. 2 is a schematic diagram of a structure of the mobile phone. As shown in FIG. 2, the mobile phone 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent devices, or may be integrated into one or more processors. The controller may be a nerve center and a command center of the mobile phone 100. The controller may generate an operation control signal based on an instruction operation code and a time sequence signal, to complete control of instruction fetching and instruction execution. A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, so that system efficiency is improved. Execution of the split-screen display method according to the embodiments of the present invention may be controlled by the processor 110 or completed by invoking another component, for example, invoking a processing program in the embodiments of the present invention that is stored in the internal memory 121, or invoking, through the external memory interface 120, a processing program in the embodiments of the present invention that is stored in a third-party device, to control the display 194 to perform a split-screen display operation.

The external memory interface 120 may be configured to connect to an external storage card such as a micro SD card, to extend a storage capability of the mobile phone 100. The external storage card communicates with the processor 110 through the external memory interface 120, to implement a data storage function. For example, a file such as an image or a video is stored in the external storage card.

The internal memory 121 may be configured to store computer-executable program code. The executable program code includes instructions. The processor 110 runs the instructions stored in the internal memory 121, to perform various function applications and data processing of the mobile phone 100. The internal memory 121 may include a program storage area and a data storage area. The program storage area may store an operating system, software code of at least one application (for example, iQIYI or WeChat), and the like. The data storage area may store data (for example, an image and a video) and the like generated in a process of using the mobile phone 100. In addition, the internal memory 121 may include a high-speed random access memory, or may include a nonvolatile memory, for example, at least one magnetic disk storage device, a flash memory, or a universal flash storage (universal flash storage, UFS). The internal memory 121 may be configured to store computer-executable program code of the split-screen display method according to the embodiments of the present invention. The executable program code includes instructions. The processor 110 may run the computer-executable program code of the split-screen display method that is stored in the internal memory 121, to enable the mobile phone 100 to complete the split-screen display method provided in the embodiments of the present invention.

The USB interface 130 is an interface that conforms to a USB standard specification, and may be specifically a mini USB interface, a micro USB interface, a USB Type-C interface, or the like. The USB interface 130 may be configured to connect to a charger to charge the mobile phone 100, or may be configured to transmit data between the mobile phone 100 and a peripheral device. The charging management module 140 is configured to receive charging input from the charger. The power management module 141 is configured to connect to the battery 142, the charging management module 140, and the processor 110. The power management module 141 receives input from the battery 142 and/or the charging management module 140, and supplies power to the processor 110, the internal memory 121, an external memory, the display 194, the camera 193, the wireless communications module 160, and the like.

A wireless communication function of the mobile phone 100 may be implemented through the antenna 1, the antenna 2, the mobile communications module 150, the wireless communications module 160, the modem processor, the baseband processor, and the like. The antenna 1 and the antenna 2 are configured to transmit and receive electromagnetic wave signals. Each antenna in the mobile phone 100 may be configured to cover one or more communication frequency bands. Different antennas may be multiplexed to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2G/3G/4G/5G or the like and that is applied to the mobile phone 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 and at least some modules of the processor 110 may be disposed in a same device.

The wireless communications module 160 may provide a wireless communication solution that includes a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the mobile phone 100. The wireless communications module 160 may be one or more components integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 of the mobile phone 100 are coupled, and the antenna 2 and the wireless communications module 160 of the mobile phone 100 are coupled, so that the mobile phone 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The display 194 may be configured to display information entered by a user, information provided for the user, and various menus of the mobile phone 100, and may further receive user input, for example, a touch operation performed by the user, and display a display interface of an application, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini LED, a micro LED, a micro OLED, a quantum dot light emitting diode (quantum dot light emitting diodes, QLED), or the like.

The display 194 may alternatively include a display panel and a touch panel. The display panel may be configured in a form of a liquid crystal display (liquid crystal display, LCD), an organic light-emitting diode (organic light-emitting diode, OLED), or the like. The touch panel, also referred to as a touchscreen, a touch-sensitive screen, or the like, may collect a contact operation or a non-contact operation performed by the user on or near the touch panel (for example, an operation performed by the user on the touch panel or near the touch panel by using any suitable object or accessory such as a finger or a stylus, or a motion sensing operation, where the operation includes operation types such as a single-point control operation and a multi-point control operation), and drive a corresponding connection apparatus based on a preset program.

Optionally, the touch panel may include two parts: a touch detection apparatus and a touch controller. The touch detection apparatus detects a touch location and a gesture of the user, detects a signal brought by an input operation, and sends the signal to the touch controller. The touch controller receives touch information from the touch detection apparatus, converts the touch information into information that can be processed by the processor, then sends the information to the processor 110, and can receive and execute a command sent by the processor 110. In addition, the touch panel may be implemented by using a plurality of types such as a resistive type, a capacitive type, an infrared ray type, and a surface acoustic wave type, or the touch panel may be implemented by using any technology developed in the future. Further, the touch panel may cover the display panel. The user may perform, based on content displayed on the display panel (the displayed content includes but is not limited to a soft keyboard, a virtual mouse, a virtual button, an icon, and the like), an operation on or near the touch panel that covers the display panel. After detecting the operation performed on or near the touch panel, the touch panel sends the operation to the processor 110 to determine the user input, and then the processor 110 provides corresponding visual output on the display panel based on the user input.

For example, in the embodiments of the present invention, after detecting a touch operation entered by the user, the touch detection apparatus in the touch panel sends a signal corresponding to the detected touch operation to the touch controller in real time, and the touch controller converts the signal into touch point coordinates and sends the touch point coordinates to the processor 110. The processor 110 determines, based on the received touch point coordinates, that the touch operation is specifically an operation of enabling a second task, then responds to the touch operation entered by the user, enables a split-screen mode, divides a display region of the display 194 into a plurality of display windows (for example, a first display window and a second display window), enables the second task, displays the second task in the second display window, and switches a first task previously displayed in full screen to be displayed in the first display window. A specific implementation of this solution is described in detail hereinafter.

In some embodiments, the mobile phone 100 may include one or N displays 194. The one or N displays 194 may be connected in a folded or flexible manner. When a plurality of displays 194 are folded, the electronic device is portable, and when the plurality of displays 194 are connected in an unfolded manner, the user can use a large screen for watching. This improves user experience. N is a positive integer greater than 1. When the electronic device includes a plurality of displays, the split-screen display method according to the embodiments of the present invention may be separately applied to one display, or may be applied to an entire large screen formed when the plurality of displays are connected in an unfolded manner.

The camera 193 is configured to capture a static image or a video. The camera 193 may include a front-facing camera and a rear-facing camera.

The mobile phone 100 may implement audio functions such as music playing or recording by using the audio module 170, the speaker 170A, the receiver 170B, the microphone 170C, the headset jack 170D, the application processor, and the like.

The pressure sensor 180A is configured to sense a pressure signal, and can convert the pressure signal into an electrical signal. In some embodiments, the pressure sensor 180A may be disposed on the display 194. The gyro sensor 180B may be configured to determine a motion posture of the mobile phone 100. In some embodiments, the gyro sensor 180B may be used to determine angular velocities of the mobile phone 100 around three axes (namely, axes x, y, and z).

The gyro sensor 180B may be configured to perform image stabilization during photographing. The barometric pressure sensor 180C is configured to measure barometric pressure. In some embodiments, the mobile phone 100 calculates an altitude based on a barometric pressure value measured by the barometric pressure sensor 180C, to assist in positioning and navigation. The magnetic sensor 180D includes a Hall effect sensor. The mobile phone 100 may detect opening and closing of a flip cover by using the magnetic sensor 180D. In some embodiments, when the mobile phone 100 is a flip phone, the mobile phone 100 can detect opening and closing of a flip cover based on the magnetic sensor 180D. Further, a feature such as automatic unlocking upon opening of the flip cover is set based on a detected opening or closing state of the flip cover. The acceleration sensor 180E may detect magnitude of acceleration of the mobile phone 100 in various directions (usually on three axes). When the mobile phone 100 is static, a value and a direction of gravity may be detected. The acceleration sensor 180E may further be configured to recognize a posture of the electronic device, and is applied to an application such as a pedometer or switching between a landscape mode and a portrait mode.

The distance sensor 180F is configured to measure a distance. The mobile phone 100 may measure a distance in an infrared manner or a laser manner. In some embodiments, in a photographing scenario, the mobile phone 100 may measure a distance by using the distance sensor 180F, to implement quick focusing. The optical proximity sensor 180G may include, for example, a light-emitting diode (LED) and an optical detector such as a photodiode. The light-emitting diode may be an infrared light-emitting diode. The mobile phone 100 may emit infrared light by using the light-emitting diode. The mobile phone 100 detects reflected infrared light from a nearby object by using the photodiode. When sufficient reflected light is detected, it may be determined that there is an object near the mobile phone 100. When insufficient reflected light is detected, the mobile phone 100 may determine that there is no object near the mobile phone 100. The mobile phone 100 may detect, by using the optical proximity sensor 180G, that the user holds the mobile phone 100 close to an ear for a call, to automatically turn off a screen for power saving. The optical proximity sensor 180G may also be used in a flip cover mode or a pocket mode to automatically unlock or lock the screen.

The ambient light sensor 180L is configured to sense ambient light brightness. The mobile phone 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the mobile phone 100 is in a pocket, to prevent an accidental touch. The fingerprint sensor 180H is configured to collect a fingerprint. The mobile phone 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the mobile phone 100 executes a temperature processing policy based on the temperature detected by the temperature sensor 180J. For example, when the temperature reported by the temperature sensor 180J exceeds a threshold, the mobile phone 100 lowers performance of a processor near the temperature sensor 180J, to reduce power consumption and implement thermal protection. In some other embodiments, when the temperature is less than another threshold, the mobile phone 100 heats the battery 142, to avoid an abnormal shutdown of the mobile phone 100 caused by a low temperature. In some other embodiments, when the temperature is less than still another threshold, the mobile phone 100 boosts an output voltage of the battery 142, to avoid an abnormal shutdown caused by a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. A visual output related to the touch operation may be provided on the display 194. In some other embodiments, the touch sensor 180K may alternatively be disposed on a surface of the mobile phone 100, and is located in a position different from that of the display 194.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse to receive a blood pressure beating signal.

The button 190 includes a power button, a volume button, and the like. The button 190 may be a mechanical button, or may be a touch button. The mobile phone 100 may receive button input, and generate button signal input related to a user setting and function control of the mobile phone 100. The motor 191 may generate a vibration prompt. The motor 191 may be configured to provide an incoming call vibration prompt or a touch vibration feedback. For example, touch operations performed on different applications (for example, photographing and audio playing) may correspond to different vibration feedback effects. The indicator 192 may be an indicator light, and may be configured to indicate a charging status and a power change, or may be configured to indicate a message, a missed call, a notification, and the like. The SIM card interface 195 is configured to connect to a SIM card. The SIM card may be inserted into the SIM card interface 195 or plugged from the SIM card interface 195, to implement contact with or separation from the mobile phone 100.

It may be understood that the components shown in FIG. 2 do not constitute a specific limitation on the mobile phone. The mobile phone may include more or fewer components than those shown in the figure, or combine some components, or split some components, or have different component arrangements. In the following embodiments, the mobile phone 100 shown in FIG. 2 is used as an example for description.

It may be understood that the schematic structure according to the embodiments of the present invention does not constitute a specific limitation on the mobile phone 100. In some other embodiments of the present invention, the mobile phone 100 may include more or fewer components than those shown in the figure, or combine some components, or split some components, or have different component arrangements. The components shown in the figure may be implemented by hardware, software, or a combination of software and hardware.

The foregoing describes a hardware structure of the mobile phone 100, and the following describes a software architecture of the mobile phone 100.

Specifically, a software system of the mobile phone 100 may use a layered architecture, an event-driven architecture, a microkernel architecture, a microservice architecture, or a cloud architecture. In an embodiment of the present invention, an Android (android) system with a layered architecture is used as an example to describe a software structure of the mobile phone 100. In the layered architecture, software is divided into several layers, and each layer has a clear role and task. The layers communicate with each other through a software interface.

Figure 3:
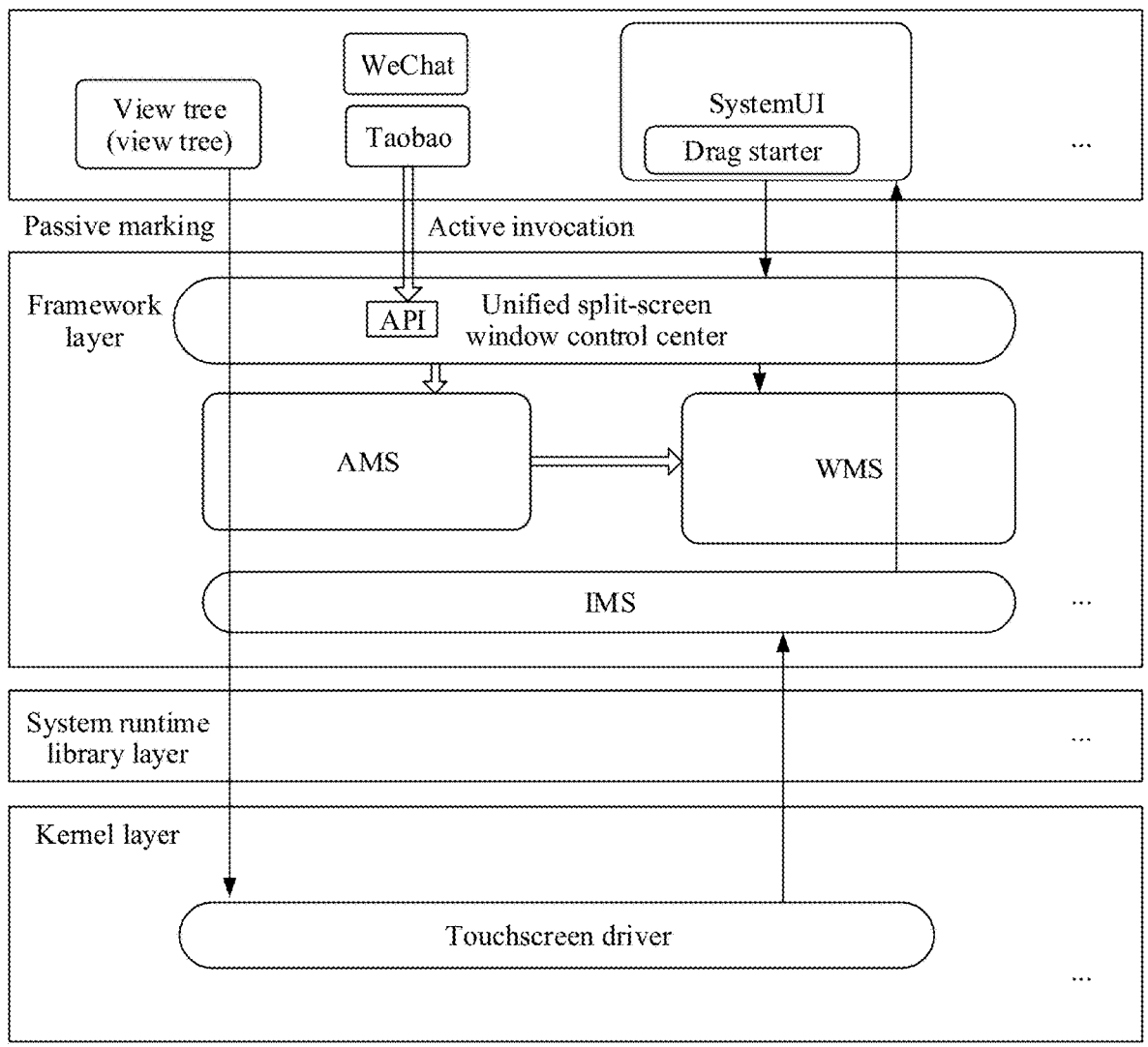
FIG. 3 is a schematic diagram of a software structure of an electronic device according to an embodiment of the present invention.

As shown in FIG. 3, in some possible embodiments, the Android system is divided into four layers from top to bottom: an application (Applications) layer ("application layer" for short in this specification), an application framework (Application Framework) layer ("framework layer" for short in this specification), an Android runtime (Android runtime) and system library layer ("system runtime and library layer" for short in this specification), and a kernel layer.

At least one application is run at the application layer, and the application may be a window (Window) application, a system setting application, a contact application, a messaging application, a clock application, a camera application, or the like that is provided in the operating system; or may be an application developed by a third-party developer, for example, an instant messaging application, a photo beautification application, or a game application. Certainly, during specific implementation, an application package at the application layer is not limited to the foregoing examples, and may actually include another application package. This is not limited in the embodiments of the present invention.

As shown in FIG. 3, in the embodiments of the present invention, a view tree (ViewTree) at the application layer is a view structure in an application interface. Generally, one display interface in an application may correspond to one ViewTree. In implementation of the present invention, a developer may mark, in a ViewTree corresponding to a display interface of an application, a view (View) control (for example, a button (Button) or an image control (ImageView)) that implements screen splitting in response to dragging. For example, as shown in FIG. 13(A) to FIG. 13(F), a WeChat interface view that may be dragged is a marked view control. A system user interface (system user interface, SystemUI) is a system-level UI component, and has system-level global permission. The SystemUI includes a drag starter (DragStarter), and the DragStarter is configured to process response logic of a user drag gesture and determine a location (up, bottom, left, or right) in which a new split-screen window is to be enabled.

The framework layer provides an application programming interface (application programming interface, API) and a programming framework for an application at the application layer. The application framework layer includes some predefined functions. The application framework layer acts as a processing center that determines an action to be performed by the application at the application layer. In the embodiments of the present invention, an open API may be added to the framework layer for an upper-layer application to invoke. For example, a function setLaunchSplitScreenLocation (int location) is added to an original activity option ActivityOption (a parameter) of a unified split-screen window control center, where the parameter location is a location at which screen splitting is to be enabled, and supports four locations: left-LEFT, right-RIGHT, up-UP, and bottom-BOTTOM. When the application enables a new activity, for example, enables the second task (opening WeChat) described in this specification, the application invokes a start activity startActivity (a function), and generates a bundle (Bundle) by using the ActivityOption for transmission, so that the application can actively trigger split-screen display.

As shown in FIG. 3, the application framework layer in the embodiments of the present invention includes an activity manager service (activity manager service, AMS) module, a window manager service (window manager service, WMS) module, a unified split-screen window control center (MultiWinSupervisor), and an input manager service (InputManagerService, IMS) module, and the like.

The input manager service module is used for input monitoring and processing of a touch event.

The unified split-screen window control center is used to: coordinate scheduling of split-screen windows, respond to invoking instructions from the application layer for an upper layer, and deliver invoking instructions of system services (such as AMS and WMS) to a lower layer. For example, when it is detected that a marked view control is dragged, related instructions for performing screen splitting are triggered for the AMS, the WMS, and the like, so as to implement passive triggering of screen splitting. For another example, when an application at the upper layer actively invokes the ActivityOption interface, related instructions for performing screen splitting are triggered for the AMS, the WMS, and the like, so as to implement active triggering of screen splitting. The activity manager service module is used to: manage a life cycle of each application and a common navigation rollback function such as controlling exit, opening, and back of the application.

The window manager service module is used to manage and draw all window interfaces, for example, control a display size, a location, and a level of a window.

Certainly, during specific implementation, the framework layer may further include a function service such as content provision, call management, resource management, and notification management. This is not limited in the embodiments of the present invention.

The system runtime library layer provides support for the upper layer, that is, the framework layer. When the framework layer is used, the Android operating system runs a C/C++ library included in the system runtime library layer, to implement a function that needs to be implemented by the framework layer.

The kernel layer is a layer between hardware and software. As shown in FIG. 3, the kernel layer includes at least a touchscreen driver. Certainly, during specific implementation, the kernel layer may further include another driver such as a camera driver and an audio driver. This is not limited in the embodiments of the present invention.

It should be understood that the software programs and/or modules corresponding to the software architecture in FIG. 3 are stored in the internal memory 121 of the mobile phone 100 shown in FIG. 2.

The following describes in detail the solutions provided in the embodiments of the present invention by using an example in which the embodiments of the present invention are applied to the foregoing mobile phone 100.

Figure 4:
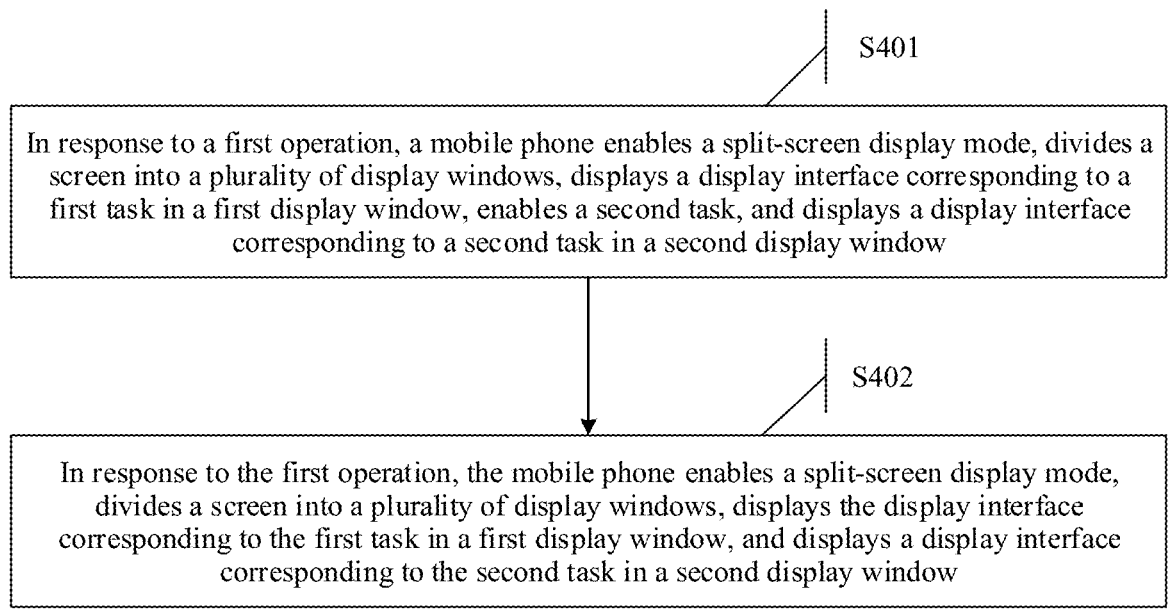
FIG. 4 is a flowchart of a split-screen display solution according to an embodiment of the present invention.

As shown in FIG. 4, a split-screen display method provided in an embodiment of the present invention includes the following steps:

S401. In a process of running a first application to execute a first task, a mobile phone displays a display interface of the first task on a display, and receives a first operation for enabling a second task, where a display interface corresponding to the second task is different from the display interface corresponding to the first task.

S402. In response to the first operation, the mobile phone enables a split-screen display mode, divides a screen into a plurality of display windows, displays the display interface corresponding to the first task in a first display window, enables the second task, and displays the display interface corresponding to the second task in a second display window.

Figures 5A, 5B:
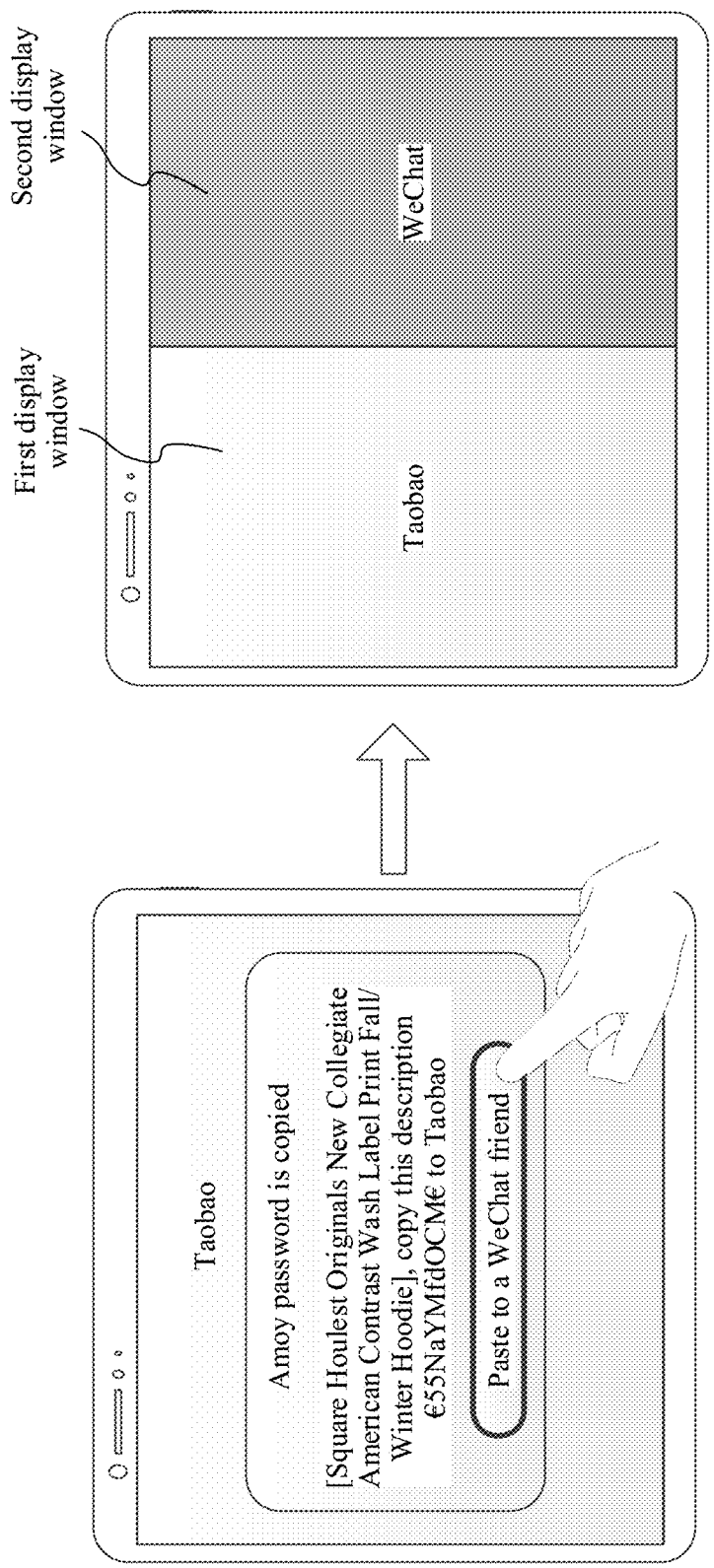
FIG. 5(A) and FIG. 5(B) are a schematic diagram of a split-screen display solution according to an embodiment of the present invention.

In the embodiments of the present invention, before the mobile phone receives the first operation, the display may display the display interface corresponding to the first task (also referred to as a first display interface in this specification) in full screen. For example, as shown in FIG. 5(A), the first task is running and displaying a commodity browsing interface of Taobao.

The first operation may be an input operation performed by a user, and a type of the input operation may be touch input, input, motion sensing input, floating input, or the like. This is not limited herein.

The second task may be an associated task triggered in a process of performing a task by the first application, for example, a WeChat sharing task triggered in Taobao, or may be a task separately triggered by the user. For example, the user enters a voice instruction "open WeChat" when browsing Taobao. This is not limited in the embodiments of the present invention. The following is mainly described in detail by using an example in which the second task is an associated task triggered in a process of performing a task by the first application.

For example, as shown in FIG. 3, when the display displays the display interface of the first task in full screen, if a touch panel in the display detects a signal brought by a touch operation entered by a user, a sensor converts the detected signal into information that can be processed by a processor, and transfers the information to the processor. A kernel layer running in the processor generates, based on the information, location data (the location data may specifically include touch point coordinates, a timestamp corresponding to the touch point coordinates, and the like) corresponding to the operation. The kernel layer uploads the collected finger location data to a framework layer, and an IMS at the framework layer determines that the first operation performed by the user (for example, as shown in FIG. 5(A), the operation performed by the user is an operation of tapping a control "paste the Amoy password to WeChat") is intended to enable the second task (that is, enable WeChat). The IMS reports, to an application (that is, Taobao) at the application layer, an event of enabling the second task. In this case, when responding to the user operation and enabling the task of opening WeChat, the application may further actively invoke an API interface at the framework layer, to trigger a unified split-screen window control center to deliver related instructions to an AMS, a WMS, and the like, to enable a system to enter the split-screen mode, and to open the display interface of the second task in a split-screen window.

In this way, an effect that an application actively triggers split-screen display based on a task can be implemented.

In some possible designs, there may be two windows obtained through division. For example, as shown in FIG. 5(B), the display is divided into two display windows arranged on the left and right. The left is the first display window, used to display the display interface (a commodity browsing page of Taobao) corresponding to the first task. The right is the second display window, used to display the display interface (a WeChat page) corresponding to the second task. Certainly, during specific implementation, locations of the first display window and the second display window may be exchanged. For example, the left is the second display window, used to display the display interface corresponding to the second task, and the right is the first display window, used to display the display interface corresponding to the first task. It should be understood that a Taobao interface and a WeChat interface in the accompanying drawings are merely used to give an example for the first task and the second task. During specific implementation, the first task and the second task may alternatively be tasks in other applications.

Figure 6B:
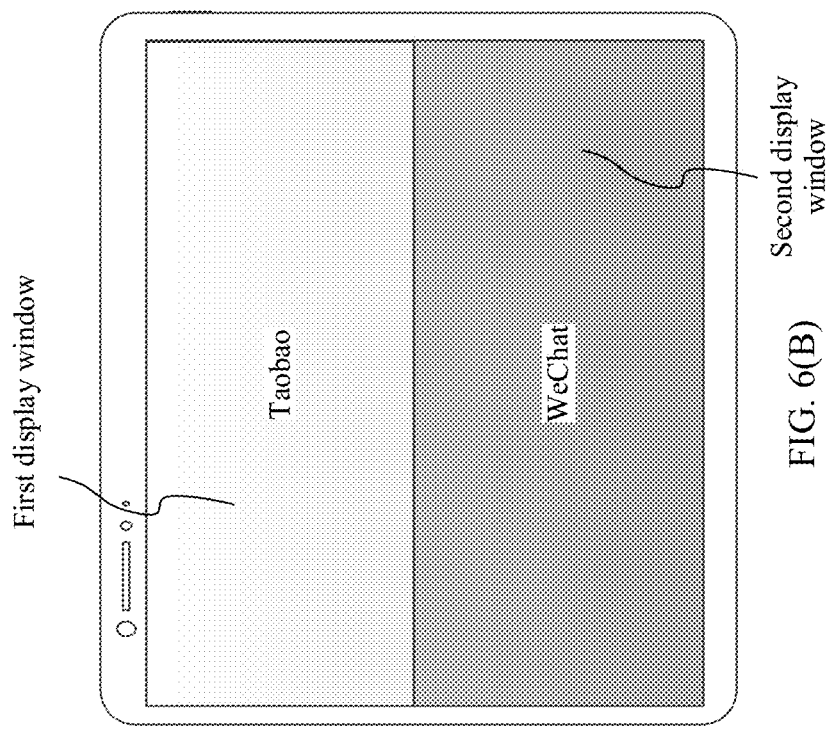
FIG. 6(A) and FIG. 6(B) are a schematic diagram of another split-screen display solution according to an embodiment of the present invention.
Figure 6A:
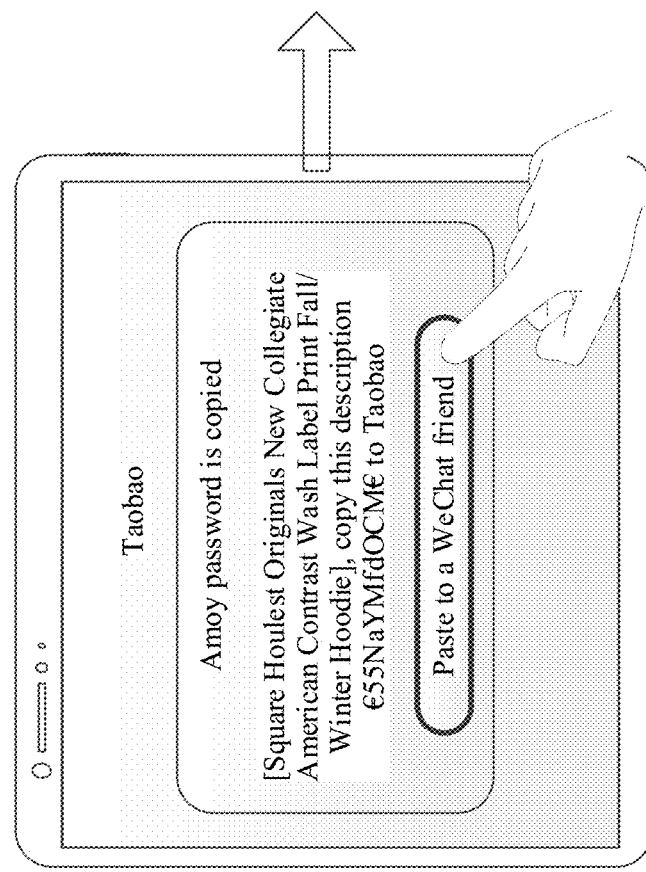

It should be noted that, other than the left-right arrangement shown in FIG. 5(A) and FIG. 5(B), a location relationship between the first display window and the second display window may alternatively be up-bottom arrangement. For example, as shown in FIG. 6(A) and FIG. 6(B), the display is divided into two windows arranged at the top and bottom, the first display window is at the top, and the second display window is at the bottom. Certainly, locations of the first display window and the second display window in FIG. 6(A) and FIG. 6(B) may also be exchanged.

Figures 7A, 7B:
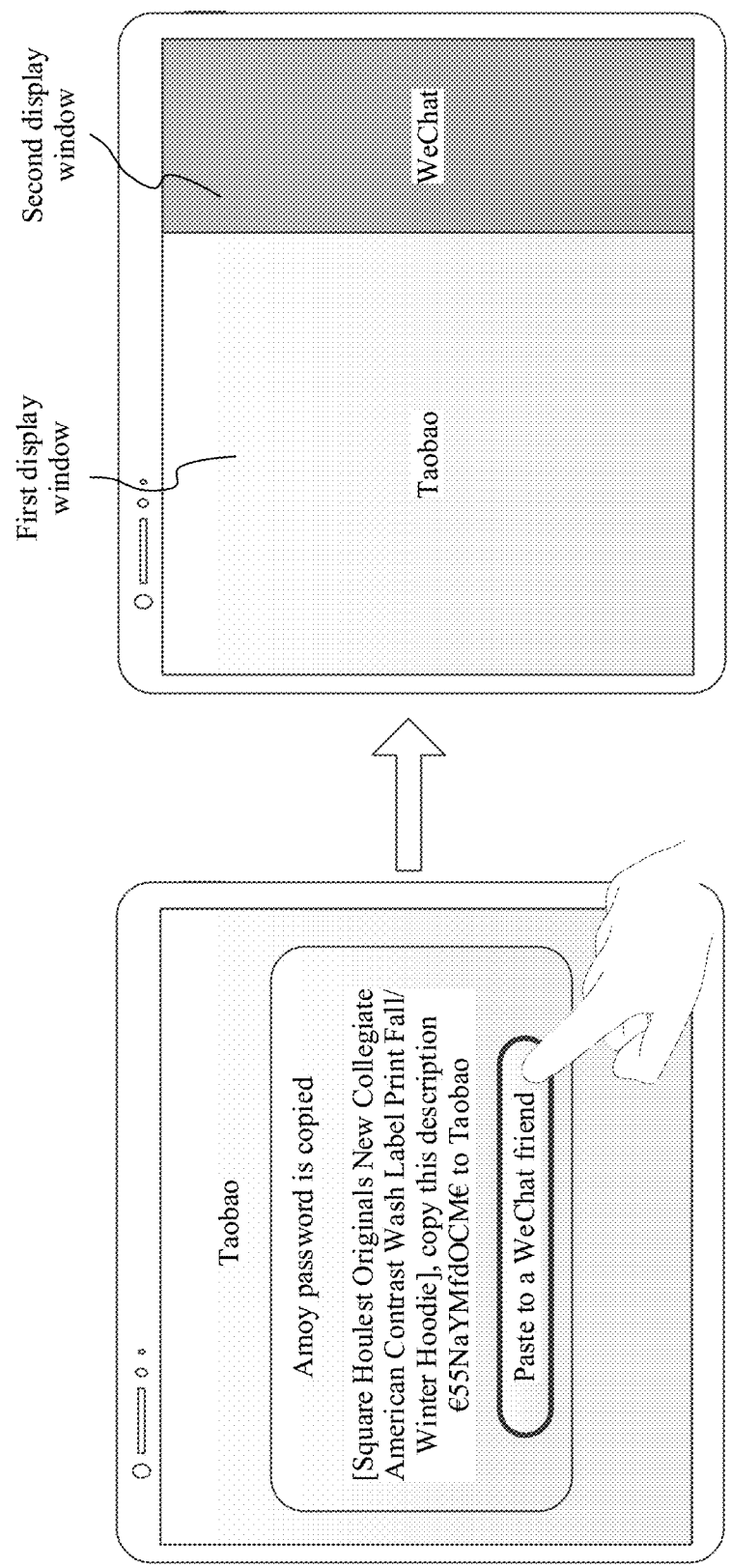
FIG. 7(A) and FIG. 7(B) are a schematic diagram of another split-screen display solution according to an embodiment of the present invention.

In the embodiments of the present invention, shapes and sizes of the first display window and the second display window may be the same, for example, as shown in FIG. 5(A) and FIG. 5(B) and FIG. 6(A) and FIG. 6(B). Certainly, shapes and sizes of the first display window and the second display window may alternatively be different. For example, as shown in FIG. 7(A) and FIG. 7(B), the second display window is smaller than the first display window. In this case, the user can more conveniently view and use the first display interface in the first display window.

In an optional implementation, the user may preset, in the system, a location relationship and a size relationship between the first display window and the second display window that are to be used after the mobile phone enters the split-screen mode.

Figure 8B:
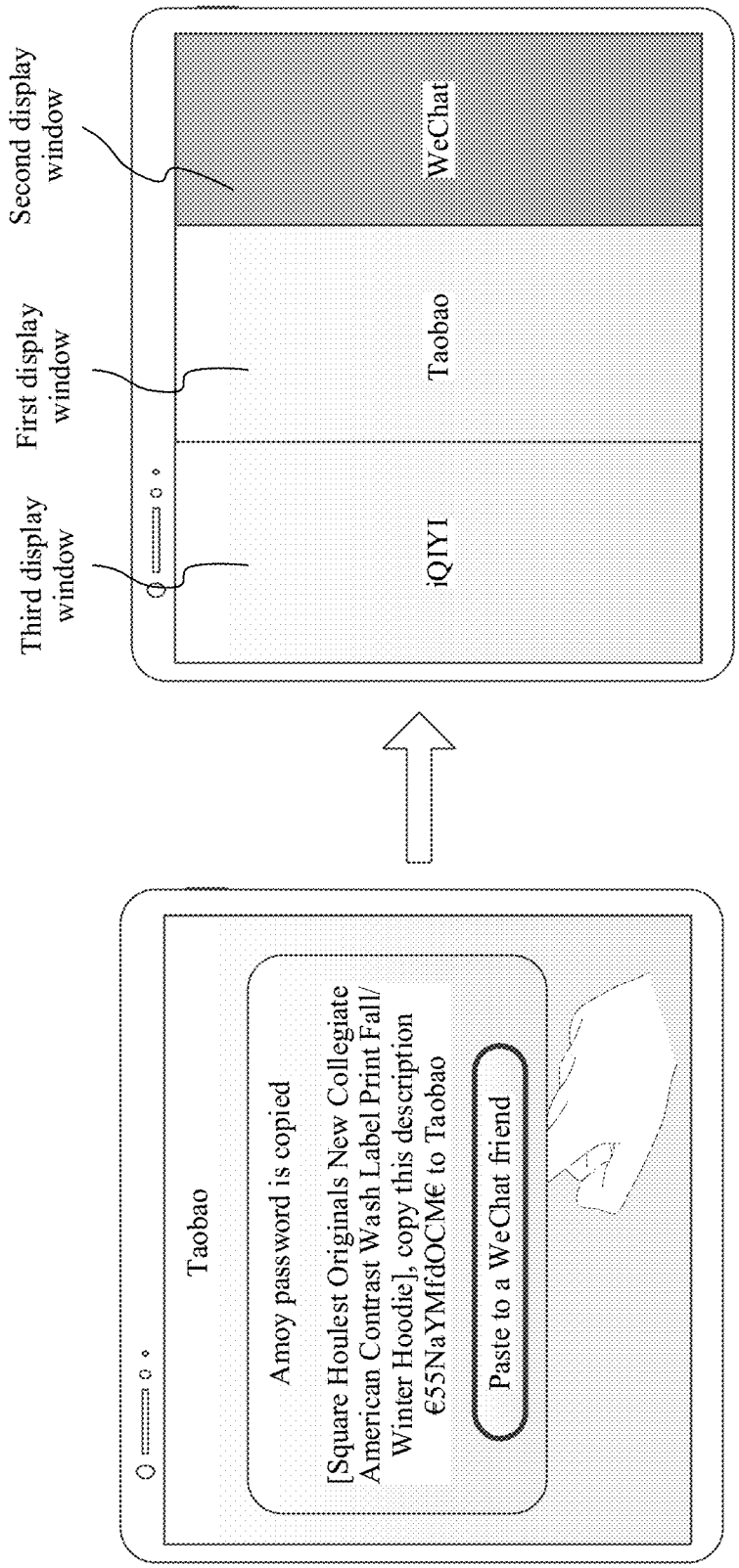
FIG. 8B(A) and FIG. 8B(B) are a schematic diagram of another split-screen display solution according to an embodiment of the present invention.

In some possible designs, there may be more than two windows obtained through division. For example, as shown in FIG. 8A(A) and FIG. 8A(B), the display is divided into three display windows, and a third display window is used to display a home screen of the system. In this way, the user may further monitor and operate the home screen. Certainly, the third display window may alternatively be an interface for displaying another application. For example, as shown in FIG. 8B(A) and FIG. 8B(B), an interface of the video app "iQIYI" is displayed in the third display window. In this way, the user can simultaneously use "iQIYI", "Taobao", and "WeChat". It should be understood that, in the embodiments of the present invention, a location relationship among the first display window, the second display window, and the third display window may alternatively be implemented in another arrangement. For example, the first display window, the second display window, and the third display window may be in a top-bottom arrangement, or in another arrangement. This is not limited herein. Shapes or sizes of the first display window, the second display window, and the third display window may be the same or may be different. This is not limited herein.

In some possible designs, the second task and the first task may be tasks in different applications. This is a scenario of cross-application split-screen display. For example, in the embodiments shown in FIG. 5(A) and FIG. 5(B) to FIG. 8B(A) and FIG. 8B(B), the application corresponding to the first task is Taobao, and an application corresponding to the second task is WeChat. In some other possible designs, the first task and the second task may be tasks in a same application. This is a scenario of in-application split-screen display.

For example, as shown in FIG. 9(A), when browsing commodities by using Taobao, if the user intends to chat with a customer service, the user taps a "customer service" icon at the bottom of a commodity browsing page (the first operation). After detecting the operation, the mobile phone directly enables a split-screen mode. The display is divided into a plurality of display windows, the commodity browsing page is displayed in a first display window, a customer service task is also enabled and run, and a customer service page is displayed in a second display window. In this way, the user can chat with the customer service while browsing commodities.

In an optional implementation, a split-screen enabling function may be added to the first application. For example, a menu option for split-screen display is added to a control used to trigger the second task, and then a function for triggering the second task is bound to a function for triggering a split-screen mode. In this way, when the user taps the menu option for split-screen display, both a trigger for the split-screen display mode and a trigger for the second task may be implemented. For example, as shown in FIG. 10(A) to FIG. 10(C), the first application is WeChat, and a first interface is a WeChat chat management interface. An option "open a split-screen window" may be added to a shortcut menu of any chat object. In this case, after bringing up a corresponding shortcut menu by touching and holding a chat object, the user can trigger, by tapping the option "open a split-screen window" (the first operation), the mobile phone to enter a split-screen display mode, and a chat interface with the chat object is displayed in the split-screen window. In this way, a prompt that split-screen display can be performed may be provided for the user, to further improve user experience.

Figures 11A, 11B:
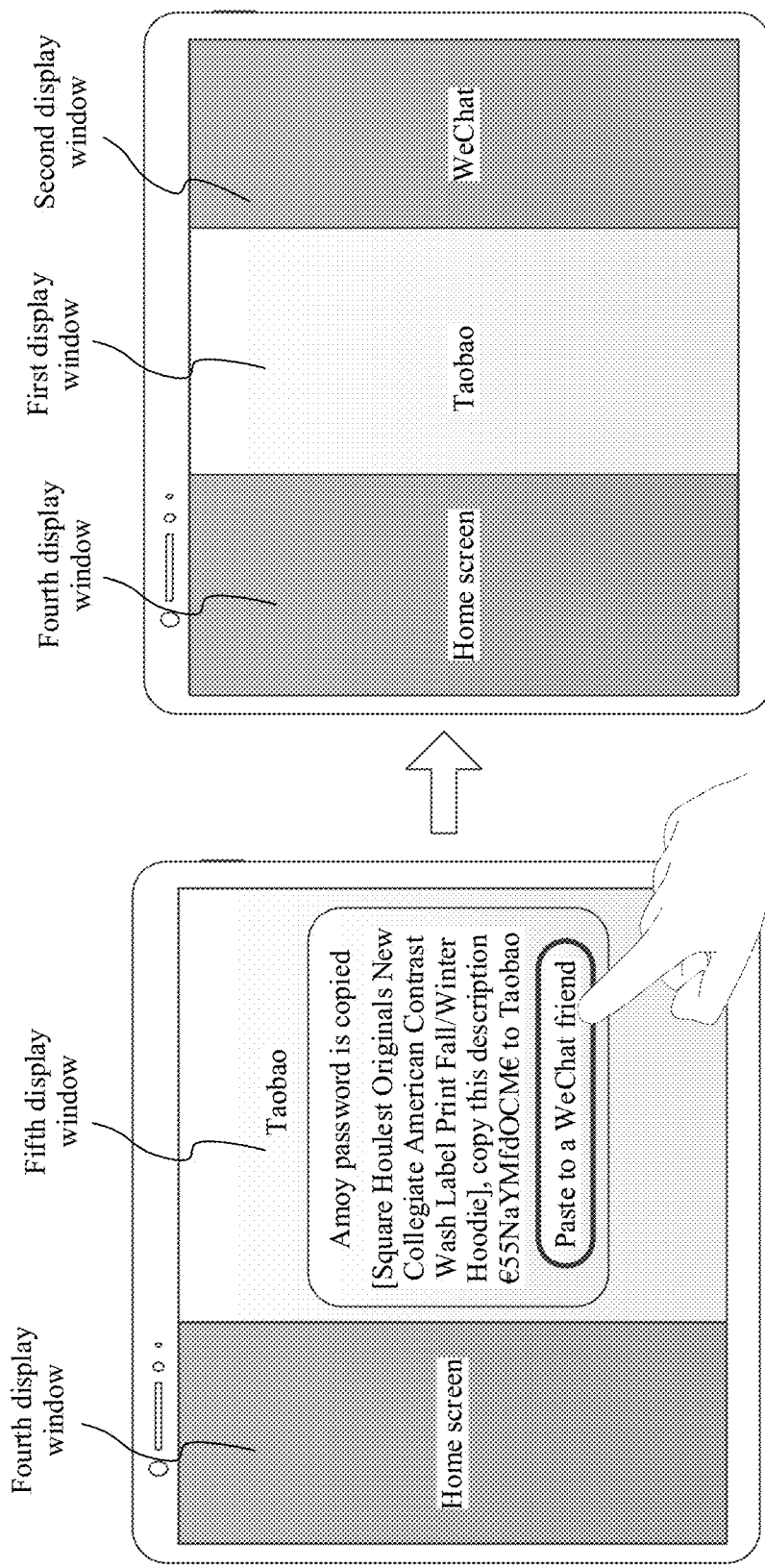
FIG. 11(A) and FIG. 11(B) are a schematic diagram of another split-screen display solution according to an embodiment of the present invention.

In an optional implementation, before the mobile phone receives the first operation, the display may alternatively display the display interface corresponding to the first task in a non-full-screen manner. For example, if two or more display windows have been displayed on the display in the split-screen mode, after the mobile phone receives the first operation, in a possible design, the mobile phone may further divide a display region that is corresponding to the first task before the mobile phone receives the first operation, and then further display the interface of the first task and the interface of the second task in a split-screen manner in the display region. For example, as shown in FIG. 11(A), the display of the mobile phone is divided into a fourth display window and a fifth display window, where a home screen is displayed in the fourth display window, and a Taobao interface is displayed in the fifth display window. After the user taps "paste to a WeChat friend" (the first operation) in the fifth display window, the mobile phone further divides a region in which the fifth display window is located into a first display window and the second display window, and then displays a WeChat interface in the second display window. In an optional implementation, during specific implementation, the mobile phone may further adjust the fourth display window, for example, adaptively adjust a size or a location of the fourth display window.

In an alternative design, before the mobile phone receives the first operation, if the mobile phone is already in the split-screen mode, that is, two or more display windows are displayed, after receiving the first operation, the mobile phone may display the display interface of the second task in another display window other than a display window corresponding to the first task, or re-divide the entire display. For example, as shown in FIG. 12(A) and FIG. 12(B), the display of the mobile phone is divided into a fourth display window and a fifth display window, where a home screen is displayed in the fourth display window, and a Taobao interface is displayed in the fifth display window. After the user taps "paste to a WeChat friend" (the first operation) in the fifth display window, the mobile phone replaces the home screen displayed in the fourth display window with the display interface corresponding to the second task, that is, a WeChat interface (in other words, the fourth display window is replaced with the second display window, where the second display window is a window for displaying the WeChat interface). In an optional implementation, during specific implementation, after replacing the home screen displayed in the fourth display window with the display interface corresponding to the second task, that is, the WeChat interface, the mobile phone may further adjust the fourth display window and the fifth display window, for example, adaptively adjust sizes or locations of the fourth display window and the fifth display window.

To further improve user experience, an embodiment of the present invention further provides solutions in which a user controls a display location of a split-screen window. Specifically, after receiving the first operation and enabling the split-screen display mode, the mobile phone first pops up a view (for example, a thumbnail of a second display interface) associated with the second task on the first display interface. In this case, the user may perform a drag operation on the view, to move the view on the screen to the top/bottom/left/right of the screen, and determine a location of a split-screen window (the second display window) based on a direction in which the view moves.

For example, the touch panel in the display detects a signal brought by a touch operation entered by the user. The sensor converts the detected signal into information that can be processed by the processor, and transfers the information to the processor. The kernel layer running in the processor generates, based on the information, location data (the location data may specifically include touch point coordinates, a timestamp corresponding to the touch point coordinates, and the like) corresponding to the operation. The kernel layer uploads the collected finger location data to the framework layer. If the IMS in the framework layer determines that the operation is a preset gesture operation (for example, dragging), the IMS reports the gesture to Drag-Starter in the SystemUI at the application layer. The DragStarter processes response logic of the user drag gesture, determines a location (up, bottom, left, or right) for enabling a new split-screen window, and delivers an instruction to the unified split-screen window control center to control split-screen display. In this way, split-screen display can be triggered passively based on a user operation.

Specifically, an application developer of the first application may specify, by using a layout (Layout) configuration file or through API invocation, a view (View) to which a split-screen event is to be bound. When receiving the first operation and determining that the second task needs to be enabled, the mobile phone displays the view on the interface of the first task. The user may drag the view to a specified location (four locations are supported: left-LEFT, right-RIGHT, up-UP, and bottom-BOTTOM). The mobile phone forms a split-screen window (the second display window) in the specified location, and displays the view in the split-screen display window. Optionally, after forming the split-screen window in the specified location, the mobile phone may display the display interface of the second task in the split-screen display window only after receiving an operation of tapping the view by the user.

A determining algorithm for determining, by the mobile phone, a location at which screen splitting is to be enabled is as follows:

(1) When a coordinate location (x, y) of a dragged UI view exceeds a split-screen response region (a dashed-line region shown in the preceding figures), split-screen is triggered in a corresponding direction.

(2) If both the horizontal direction and the vertical direction exceed the split-screen response region, based on a last recorded coordinate point (x0, y0) and displacement dx=|x−x0|, dy=|y−y0| in a period of time, whether a current finger movement direction tends to be the horizontal direction or the vertical direction is determined by comparing dx and dy. If dx>dy, it indicates that the finger moves more obviously in the horizontal direction; and if x>x0, it indicates that the finger moves rightward, and right split-screen is triggered; or if x<x0, left split-screen is triggered. If dx<dy, it indicates that the finger moves more obviously in the vertical direction; and if y>y0, it indicates that the finger moves downward, and bottom split-screen is triggered; or if y<y0, up split-screen is triggered.

Figure 13A:
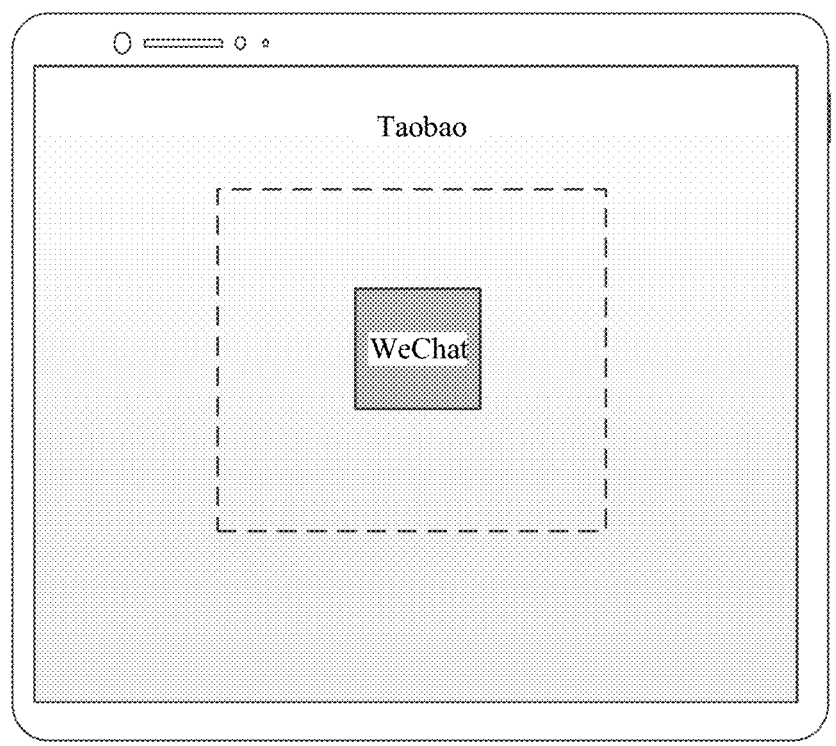
Figure 13C:
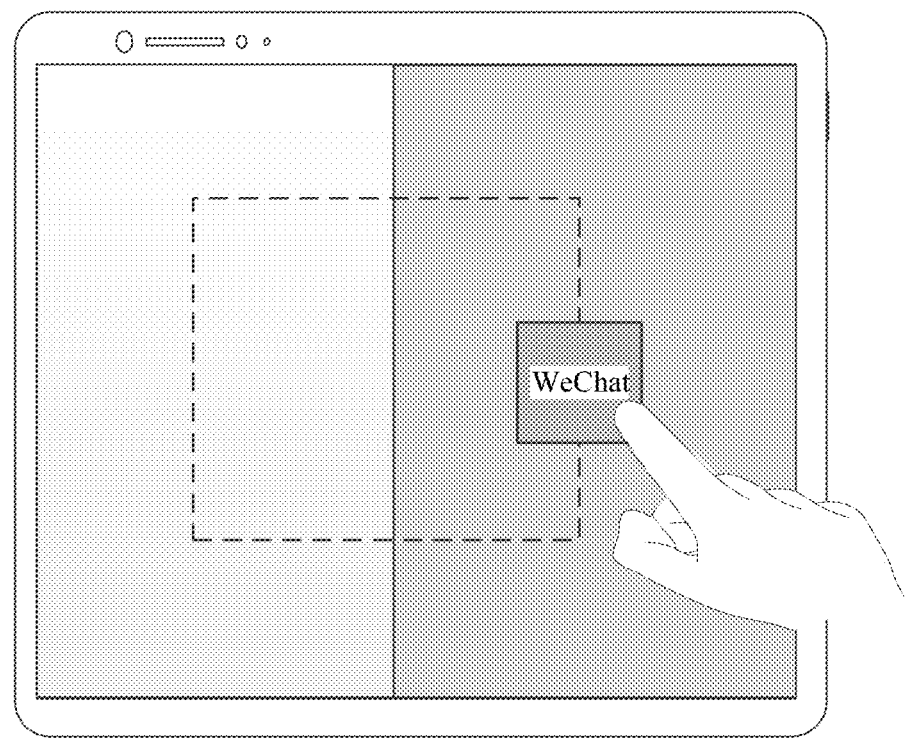
Figures 13A, 13D:
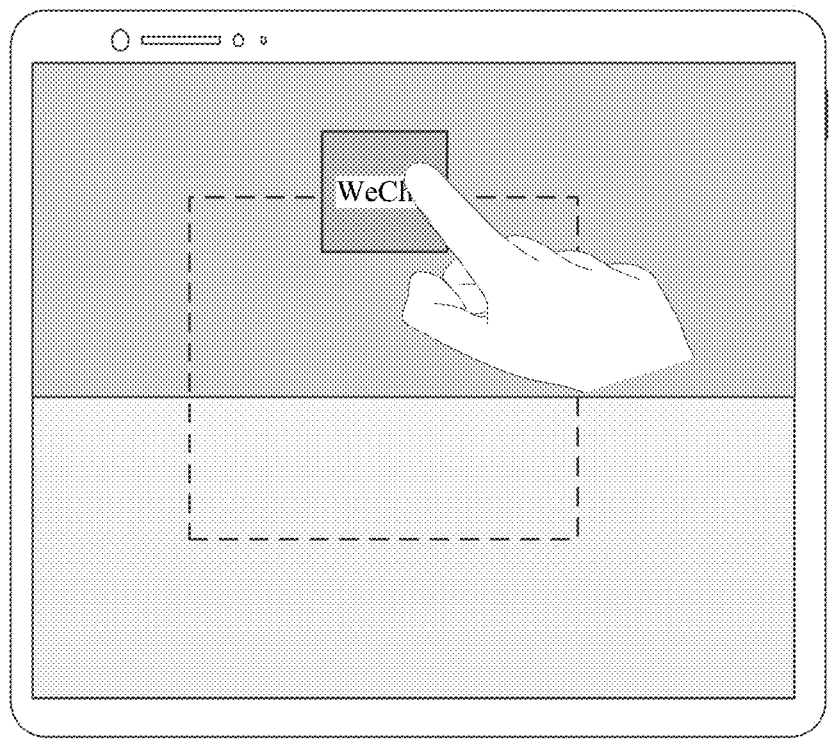
Figure 13E:
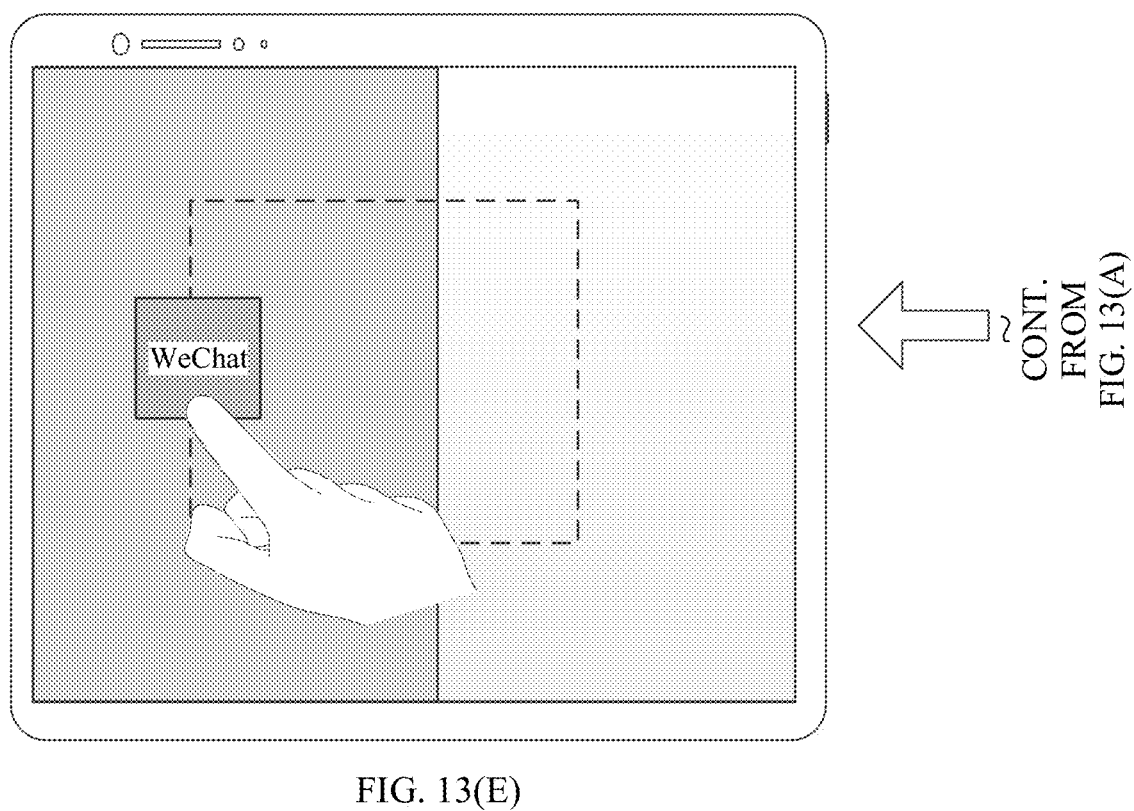
Figure 14A:
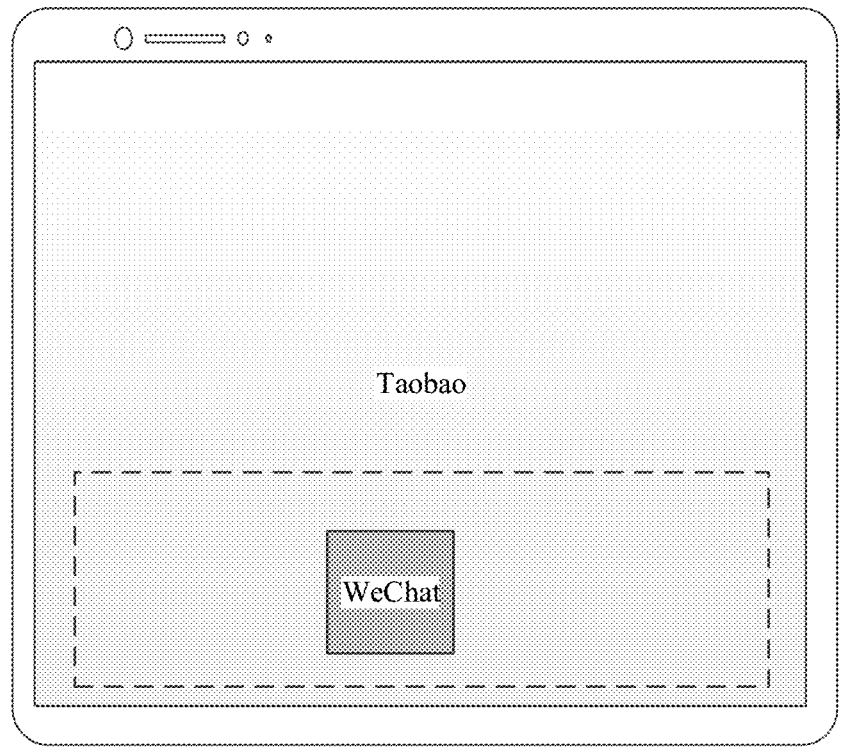
Figure 14C:
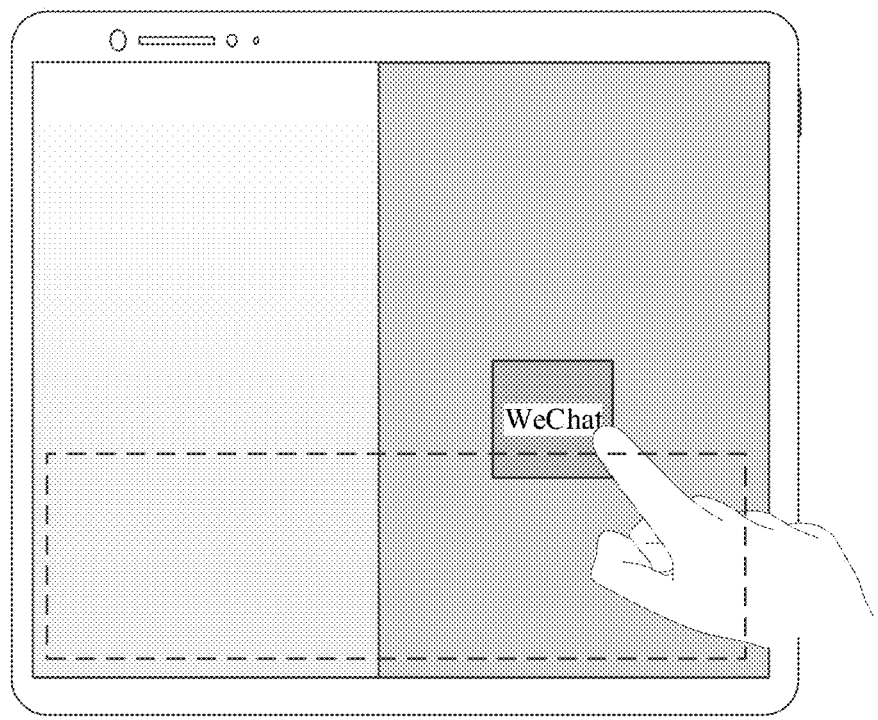
Figures 14A, 14D:
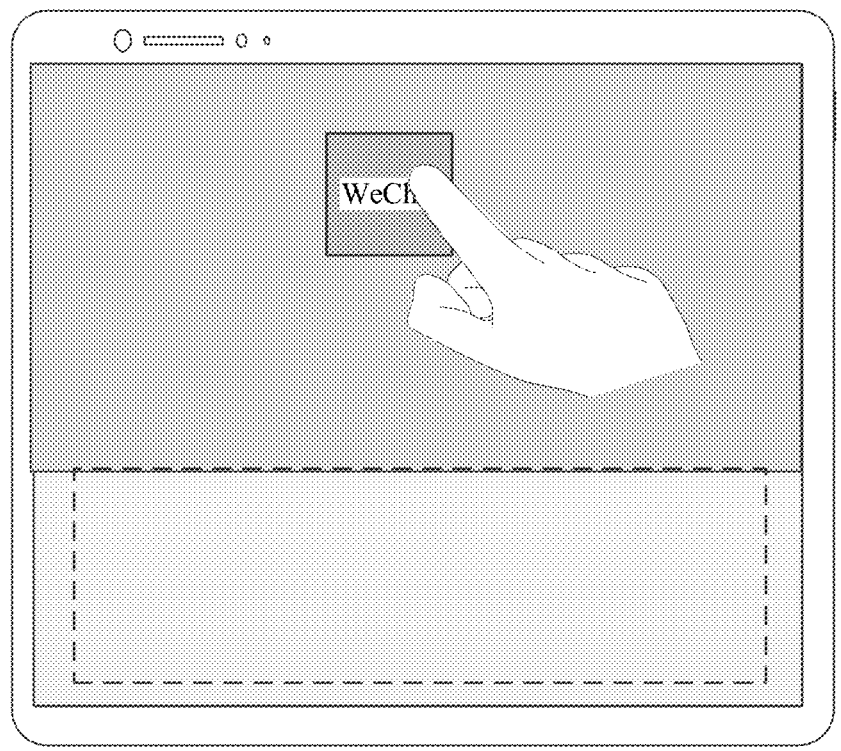
Figure 14E:
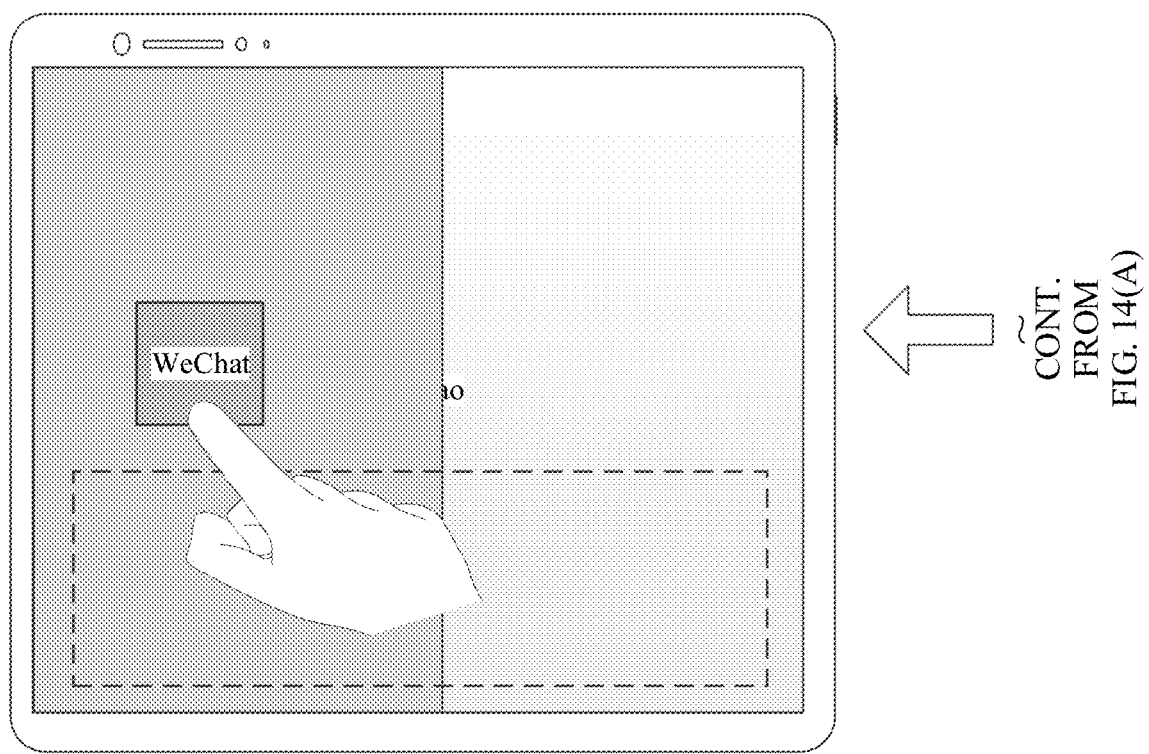
Figures 15A, 15B:
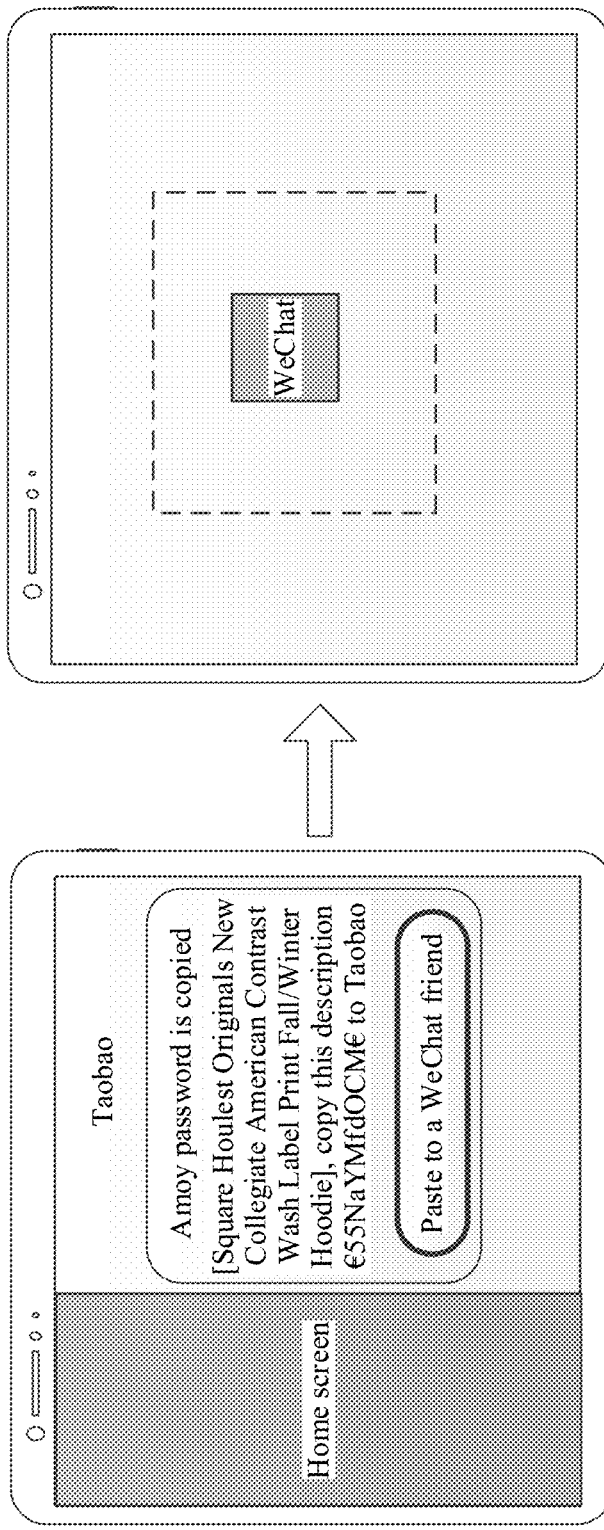
FIG. 15(A) to FIG. 15(D) are a schematic diagram of another split-screen display solution according to an embodiment of the present invention.
Figure 15C:
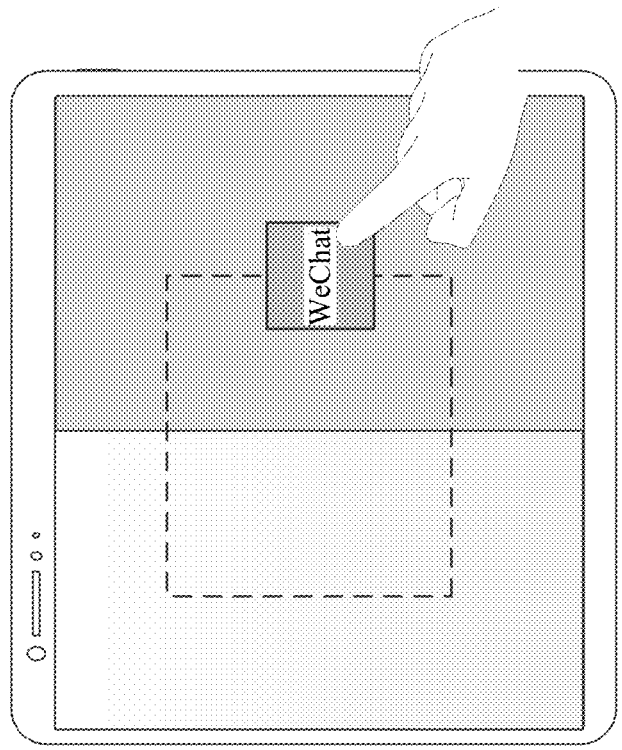
Figure 15D:
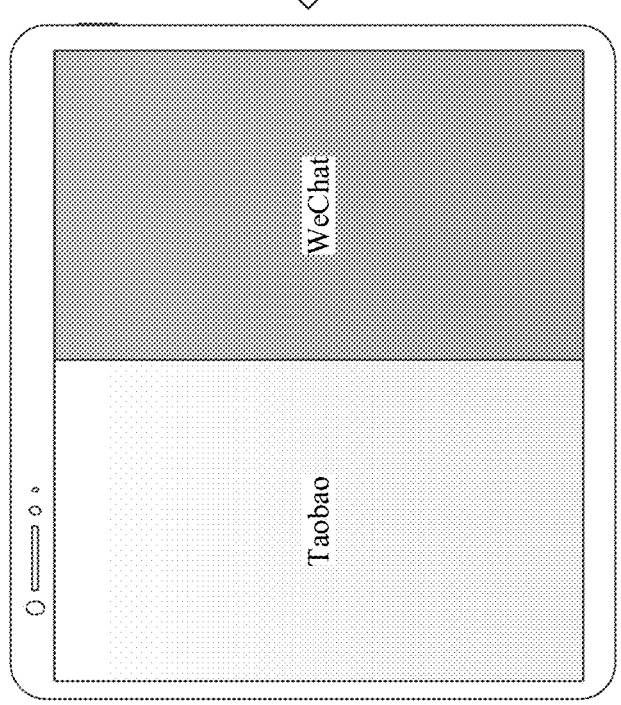

For example, as shown in FIG. 13(A) to FIG. 13(F), after the user performs the first operation on a Taobao interface, the mobile phone enables the split-screen mode in response to the first operation. In this case, a thumbnail is popped up on the Taobao interface, as shown in FIG. 13(A). In this case, the user may perform a drag operation on the thumbnail, for example, drag rightward as shown in FIG. 13(B), drag downward as shown in FIG. 13(C), drag upward as shown in FIG. 13(D), or drag leftward as shown in FIG. 13(E). The mobile phone determines a location of the split-screen window based on a moving direction of the view. For example, as shown in FIG. 13(F), when the moving direction is downward, the display is divided into two windows in an up-bottom arrangement, where the second display window for displaying the second task (WeChat) is located below, and the first display window for displaying the first task (Taobao) is located above. A location of a split-screen display window in another drag manner is similar, and details are not described herein.

In a possible design, after the display displays the view, when the user touches and holds the view with a single finger or two fingers, a copy (shadow) of the view that can be dragged by the user is generated. In this case, the user may perform an operation of dragging the copy of the view to a specified location. Further, an effect of displaying the second task in split screen is implemented. If the user taps the view after the view is displayed on the display, the mobile phone still normally opens a new page (that is, exits the interface of the first task, and displays the interface of the second task in full screen). In this way, after the user performs the first operation, the user may select, based on a requirement, whether to perform split-screen display. This can improve user experience.

In an alternative implementation, as shown in FIG. 14(A) to FIG. 14(F), an initial display location of the view may alternatively be an upper/lower/left/right edge location of the first display interface. In this way, shielding on main display content in the first display interface by the view can be further reduced.

In a possible design, as shown in FIG. 15(A) to FIG. 15(D), if the mobile phone has entered the split-screen mode before the first operation, a display window on the entire display may be re-divided based on a drag operation of the user, and the display interface (in other words, a display interface in which a user input operation is last received, that is, Taobao) of the first task and the display interface corresponding to the second task are respectively displayed in two new display windows obtained through division. In this way, an effect of flexibly updating the split-screen display window based on a user requirement can be implemented. This further improves user experience. Certainly, screen splitting may further be performed on an original display region of the first task (Taobao), and display of an original split-screen window (home screen) remains unchanged.

In an optional implementation, an area of the view does not exceed a specified threshold area, for example, does not exceed one-third or one-fifth of an area of the first display interface. In this way, shielding on content in the first display interface by the view can be reduced. This improves user experience.

In an optional implementation, the view may be displayed in a semi-transparent manner. In this way, shielding on main display content in the first display interface by the view can be further reduced. This improves a visual effect.

In the foregoing embodiments, the method provided in the embodiments of the present invention is described from a perspective of the electronic device (the mobile phone 100) used as an execution body. To implement functions in the method provided in the embodiments of the present invention, a terminal device may include a hardware structure and/or a software module, to implement the functions in a form of the hardware structure, the software module, or a combination of the hardware structure and the software module. Whether a specific function in the foregoing functions is performed by the hardware structure, the software module, or the combination of the hardware structure and the software module depends on specific applications and design constraints of the technical solutions.

Figure 16:
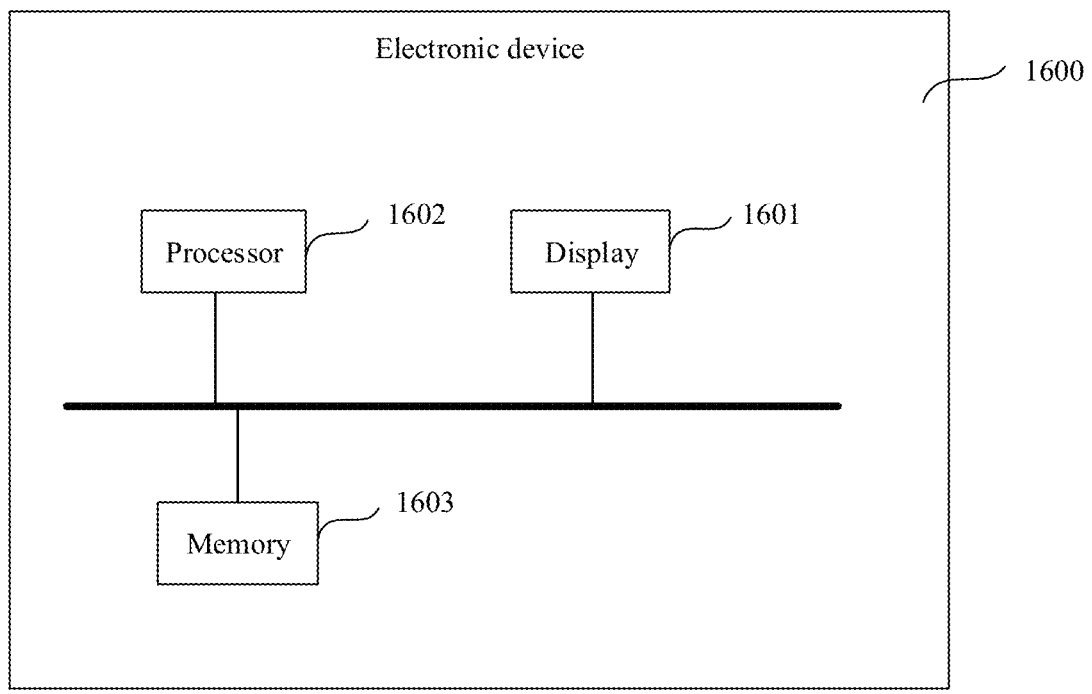
FIG. 16 is a schematic diagram of a hardware structure of another electronic device according to an embodiment of the present invention.

Based on a same technical concept, an embodiment of the present invention further provides an electronic device 1600, configured to perform steps of the split-screen display method according to the foregoing embodiments of the present invention. As shown in FIG. 16, the electronic device 1600 includes a display 1601; one or more processors 1602; a memory 1603; a plurality of applications; and one or more computer programs. The one or more computer programs are stored in the memory, the one or more computer programs include instructions, and when the instructions are invoked and executed by the one or more processors, the electronic device is enabled to implement the split-screen display method according to the embodiments of the present invention.

The processor 1602 may be a general-purpose processor, a digital signal processor (digital signal processor, DSP), an application-specific integrated circuit (application specific integrated circuit, ASIC), a field programmable gate array (field programmable gate array, FPGA) or another programmable logic device, a discrete gate or a transistor logic device, or a discrete hardware component. The processor may implement or perform the methods, steps, and logical block diagrams that are disclosed in the embodiments of the present invention. The general-purpose processor may be a microprocessor, or the processor may be any conventional processor or the like. The steps in the methods disclosed with reference to the embodiments of the present invention may be directly performed by a hardware decoding processor, or may be performed by using a combination of hardware and software modules in a decoding processor. The software module may be located in a mature storage medium in the art, such as a random access memory (random access memory, RAM), a flash memory, a read-only memory (read-only memory, ROM), a programmable read-only memory, an electrically erasable programmable memory, or a register. The storage medium is located in the memory, and the processor reads instructions in the memory and completes the steps in the foregoing methods in combination with hardware of the processor.

When the electronic device shown in FIG. 16 is the mobile phone 100, the processor 1601 may be the processor 110, the display 1601 may be the display 194, and the memory 1603 may be the internal memory 121.

For related features of specific implementations of an apparatus, refer to the foregoing method part. Details are not described herein again.

Based on a same technical concept, an embodiment of the present invention further provides an electronic device. The electronic device includes modules/units for performing the foregoing split-screen display method in the embodiments of the present invention. These modules/units may be implemented by hardware, or may be implemented by hardware executing corresponding software.

Based on a same technical concept, an embodiment of the present invention further provides a computer storage medium including computer instructions. When the computer instructions are run on an electronic device, the electronic device is enabled to perform the split-screen display method according to the embodiments of the present invention.

Based on a same technical concept, an embodiment of the present invention further provides a program product. When the program product runs on a computer, the computer is enabled to perform the split-screen display method according to the embodiments of the present invention.

Based on a same technical concept, an embodiment of the present invention further provides a chip. The chip is coupled to a memory in an electronic device, and is configured to invoke a computer program stored in the memory and perform the split-screen display method according to the embodiments of the present invention. In the embodiments of the present invention, "coupling" means a direct combination or an indirect combination of two components.

Based on a same technical concept, an embodiment of the present invention further provides a graphical user interface on an electronic device. The electronic device includes a display, one or more memories, and one or more processors. The one or more processors are configured to execute one or more computer programs stored in the one or more memories. The graphical user interface includes the split-screen display method according to the embodiments of the present invention that is performed by the electronic device.

The embodiments of the present invention may be used separately, or may be used in combination, to achieve different technical effects.

The foregoing embodiments are merely used to describe the technical solutions of the present invention in detail. However, descriptions of the foregoing embodiments are merely intended to help understand the method according to the embodiments of the present invention, and shall not be construed as a limitation on the embodiments of the present invention. Variations or replacements readily figured out by a person skilled in the art shall fall within the protection scope of the embodiments of the present invention.

According to the context, the term "when" used in the foregoing embodiments may be interpreted as a meaning of "if", "after", "in response to determining", or "in response to detecting". Similarly, according to the context, the phrase "when it is determined that" or "if (a stated condition or event) is detected" may be interpreted as a meaning of "if it is determined that", "in response to determining", "when (a stated condition or event) is detected", or "in response to detecting (a stated condition or event)".

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or the functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

For a purpose of explanation, the foregoing descriptions are described with reference to specific embodiments. However, the foregoing example discussion is not intended to be detailed, and is not intended to limit the present invention to a disclosed precise form. According to the foregoing teaching content, many modification forms and variation forms are possible. Embodiments are selected and described to fully illustrate the principles of the present invention and practical application of the principles, so that other persons skilled in the art can fully use the present invention and various embodiments that have various modifications applicable to conceived specific usage.

What is claimed is:

1. A split-screen display method, wherein the method comprises:
   displaying a display interface corresponding to a first task on a display when a first application is run to execute the first task;
   receiving, on an element of the display interface corresponding to the first task, a first operation within the first application and used to enable a second task;
   enabling a split-screen display mode in response to the first operation, wherein the enabling the split-screen display mode in response to the first operation comprises:

generating a view of a display interface corresponding to the second task, and displaying the view on the display interface corresponding to the first task;

determining a location of a split-screen display window based on a second operation for the view in response to the second operation, wherein the second operation comprises a first sub-operation and a second sub-operation, the first sub-operation is an operation of dragging the view or a copy of the view to a preset location, the second sub-operation is an operation of touching and holding the view with a single finger or touching and holding the view with two fingers, and the determining the location of the split-screen display window based on the second operation comprising determining the preset location to be the location of the split-screen display window; and displaying the split-screen display window at the location of the split-screen display window after the first sub-operation is received, and displaying the display interface corresponding to the second task in the split-screen display window.

2. The method according to claim 1, wherein the displaying the display interface corresponding to the first task on the display when the first application is run to execute the first task comprises:

displaying the display interface corresponding to the first task on the display in full screen.

3. The method according to claim 1, wherein the second task is a task in the first application; or the second task is a task in a second application, and the second application is different from the first application.

4. The method according to claim 1, wherein the enabling the split-screen display mode in response to the first operation comprises:

generating at least two display windows on the display, wherein the at least two display windows comprise a first display window and a second display window; displaying the display interface corresponding to the first task in the first display window; and displaying a display interface corresponding to the second task in the second display window.

5. The method according to claim 1, wherein the second operation further comprises a third sub-operation after the first sub-operation, and the third sub-operation is an operation of tapping the view; and the method further comprises: displaying the display interface corresponding to the second task in the split-screen display window after the third sub-operation is received.

6. An electronic device, comprising a display; one or more processors; a memory; a plurality of applications; and one or more computer programs, wherein the one or more computer programs are stored in the memory, the one or more computer programs comprise instructions, and when the instructions are invoked and executed by the one or more processors, the electronic device is enabled to perform the following steps:

displaying a display interface corresponding to a first task on the display when a first application is run to execute the first task;

receiving, on an element of the display interface corresponding to the first task, a first operation within the first application and used to enable a second task;

enabling a split-screen display mode in response to the first operation, wherein the enabling the split-screen display mode in response to the first operation comprises:

generating a view of a display interface corresponding to the second task, and displaying the view on the display interface corresponding to the first task;

determining a location of a split-screen display window based on a second operation for the view in response to the second operation, wherein the second operation comprises a first sub-operation and a second sub-operation, the first sub-operation is an operation of dragging the view or a copy of the view to a preset location, the second sub-operation is an operation of touching and holding the view with a single finger or touching and holding the view with two fingers, and the determining the location of the split-screen display window based on the second operation comprising determining the preset location to be the location of the split-screen display window; and displaying the split-screen display window at the location of the split-screen display window after the first sub-operation is received, and displaying the display interface corresponding to the second task in the split-screen display window.

7. The electronic device according to claim 6, wherein when the instructions are invoked and executed by the one or more processors, the electronic device is enabled to perform the following step: displaying the display interface corresponding to the first task on the display in full screen.

8. The electronic device according to claim 6, wherein the second task is a task in the first application; or the second task is a task in a second application, and the second application is different from the first application.

9. The electronic device according to claim 6, wherein when the instructions are invoked and executed by the one or more processors, the electronic device is enabled to perform the following steps: generating at least two display windows on the display, wherein the at least two display windows comprise a first display window and a second display window; displaying the display interface corresponding to the first task in the first display window; and displaying a display interface corresponding to the second task in the second display window.

10. The electronic device according to claim 6, wherein the second operation further comprises a third sub-operation after the first sub-operation, and the third sub-operation is an operation of tapping the view; and when the instructions are invoked and executed by the one or more processors, the electronic device is further enabled to perform the following step: displaying the display interface corresponding to the second task in the split-screen display window after the third sub-operation is received.

11. A non-transitory computer-readable storage medium, comprising computer instructions, wherein when the computer instructions are run on an electronic device, the electronic device is enabled to perform:

displaying a display interface corresponding to a first task on a display when a first application is run to execute the first task;

receiving, on an element of the display interface corresponding to the first task, a first operation within the first application and used to enable a second task; and enabling a split-screen display mode in response to the first operation, wherein the enabling the split-screen display mode in response to the first operation comprises:

generating a view of a display interface corresponding to the second task, and displaying the view on the display interface corresponding to the first task;

determining a location of a split-screen display window based on a second operation for the view in response to the second operation, wherein the second operation comprises a first sub-operation and a second sub-operation, the first sub-operation is an operation of dragging the view or a copy of the view to a preset location, the second sub-operation is an operation of touching and holding the view with a single finger or touching and holding the view with two fingers, and the determining the location of the split-screen display window based on the second operation comprising determining the preset location to be the location of the split-screen display window; and displaying the split-screen display window at the location of the split-screen display window after the first sub-operation is received, and displaying the display interface corresponding to the second task in the split-screen display window.

12. The computer storage medium according to claim 11, wherein the enabling a split-screen display mode in response to the first operation, the electronic device is enabled to perform:

generating at least two display windows on the display, wherein the at least two display windows comprise a first display window and a second display window; displaying the display interface corresponding to the first task in the first display window; and displaying a display interface corresponding to the second task in the second display window.

\* \* \* \* \*